US012759584B2

(12) United States Patent
Sorensen et al.

(10) Patent No.: US 12,759,584 B2
(45) Date of Patent: Oct. 13, 2026

(54) SYSTEMS AND METHODS FOR SERVICING VEHICLE MESSAGES

(71) Applicant: Aurora Operations, Inc., Pittsburgh, PA (US)

(72) Inventors: Michael David Sorensen, Pittsburgh, PA (US); Matthew Charles Ellis Wood, Pittsburgh, PA (US); Matthew James Harris, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 63 days.

(21) Appl. No.: 18/645,701

(22) Filed: Apr. 25, 2024

(65) Prior Publication Data

US 2024/0294190 A1 Sep. 5, 2024

Related U.S. Application Data

(62) Division of application No. 16/866,977, filed on May 5, 2020, now Pat. No. 11,993,285.

(Continued)

(51) Int. Cl.
*H04L 9/32* (2006.01)
*B60W 60/00* (2020.01)
(Continued)

(52) U.S. Cl.
CPC ......... *B60W 60/0015* (2020.02); *G06Q 50/40* (2024.01); *H04L 9/3247* (2013.01); (Continued)

(58) Field of Classification Search
CPC .......... B60W 60/0015; B60W 2556/20; G06Q 50/40; G06Q 2220/00; G06Q 2240/00; (Continued)

(56) References Cited

U.S. PATENT DOCUMENTS 7,409,428 B1 8/2008 Brabec et al.
9,489,661 B2 11/2016 Evans et al.
(Continued)

FOREIGN PATENT DOCUMENTS

WO WO 2020/176975 A1 9/2020

OTHER PUBLICATIONS

Barootkar et al., "RLHOR: Reliability-aware location and history based opportunistic routing", 6th International Symposium on Telecommunications, 2012, pp. 626-631.

(Continued)

*Primary Examiner* — Khoi V Le
(74) *Attorney, Agent, or Firm* — Dority & Manning, P.A.

(57) ABSTRACT

Systems and methods for servicing vehicle messages utilizing a common communications infrastructure are provided. A method includes obtaining, by a vehicle computing system onboard an autonomous vehicle, a message including a cryptographic signature and contextual information, a request, or a command. The method includes determining an originating sender associated with the message based on the cryptographic signature and determining a message privilege for the message based on the originating sender. The originating sender is a process that generated the message. The method includes determining a response for the contextual information, the request, or the command based on the message privilege. The response is indicative of an acceptance or rejection of contextual information, an assignment of computing resources to a request, or an acceptance or rejection of a command. The method includes performing a vehicle action based on the response.

20 Claims, 14 Drawing Sheets

Related U.S. Application Data

(60) Provisional application No. 62/994,500, filed on Mar. 25, 2020, provisional application No. 62/990,040, filed on Mar. 16, 2020.

(51) Int. Cl.
*G06Q 50/40* (2024.01)
*H04L 9/40* (2022.01)
*H04W 4/46* (2018.01)

(52) U.S. Cl.
CPC ............. *H04L 63/102* (2013.01); *H04W 4/46* (2018.02); *B60W 2556/20* (2020.02); *G06Q 2220/00* (2013.01); *G06Q 2240/00* (2013.01); *H04L 2209/84* (2013.01)

(58) Field of Classification Search
CPC .......... G06Q 30/0645; G06Q 10/06316; H04L 9/3247; H04L 9/0631; H04L 9/3265; H04L 63/102; H04L 63/12; H04L 2209/84; H04W 4/46; H04W 4/40; G16Y 30/10; G06F 21/6209; G06F 21/64
See application file for complete search history.

(56) References Cited

U.S. PATENT DOCUMENTS

| | | | | |
|---|---|---|---|---|
| 9,963,106 | B1 | 5/2018 | Ricci | |
| 11,539,685 | B2 * | 12/2022 | Simic | H04L 9/3263 |
| 2002/0046250 | A1 | 4/2002 | Nassiri | |
| 2009/0106549 | A1 * | 4/2009 | Mohamed | G06F 21/6218 713/156 |
| 2011/0099380 | A1 | 4/2011 | Vandewater | |
| 2013/0275530 | A1 | 10/2013 | Matson et al. | |
| 2016/0330036 | A1 | 11/2016 | Zhou et al. | |
| 2017/0006029 | A1 * | 1/2017 | Pedersen | H04W 12/50 |
| 2017/0111368 | A1 | 4/2017 | Hibbert et al. | |
| 2017/0310625 | A1 | 10/2017 | Hu et al. | |
| 2017/0339034 | A1 | 11/2017 | Lin et al. | |
| 2019/0028421 | A1 | 1/2019 | Duchastel et al. | |
| 2020/0044827 | A1 | 2/2020 | Snow | |
| 2020/0136894 | A1 | 4/2020 | Bush et al. | |
| 2021/0044976 | A1 * | 2/2021 | Avetisov | H04W 12/08 |

OTHER PUBLICATIONS

Chattopadhyay et al., "Autonomous Vehicle: Security by Design", arXiv:1810.00545v1, Oct. 1, 2018, 12 pages.
Greenberg, "Hackers Remotely Kill a Jeep on the Highway—With Me in it", http://wired.com/2015/07/hackers-remotely-kill-jeep-highway/. retrieved on Mar. 5, 2021, 12 pages.
Hurley-Smith et al., "SUPERMAN: Security Using Pre-Existing Routing for Mobile Ad hoc Networks", IEEE Transactions On Mobile Computing, vol. 16, No. 10, Oct. 2017, 14 pages.
International Preliminary Report on Patentability for Application No. PCT/US2021/022465, mailed Sep. 29, 2022, 11 pages.
International Search Report and Written Opinion for PCT/US2021/022465, mailed Jul. 9, 2021, 19 pages.
Lopez et al., "Security of Emergent Automotive Systems: A Tutorial Introduction and Perspectives on Practice", IEEE Design & Test, Nov./Dec. 2019, 30 pages.

* cited by examiner

SYSTEMS AND METHODS FOR SERVICING VEHICLE MESSAGES

RELATED APPLICATION

The present application is based on and claims benefit of U.S. Provisional Patent Application No. 62/990,040 having a filing date of Mar. 16, 2020, Provisional Patent Application No. 62/994,500 having a filing date of Mar. 25, 2020, and U.S. patent application Ser. No. 16/866,977, all of which are incorporated by reference herein.

FIELD

The present disclosure relates generally to vehicle security infrastructure. In particular, signing techniques can be utilized to identify different processes interacting with a vehicle.

BACKGROUND

An autonomous vehicle can be capable of sensing its environment and navigating with little to no human input. In particular, an autonomous vehicle can interact with devices that run a plurality of processes. The processes can communicate with each other through a series of messages. The messages can be communicated over encrypted or unencrypted channels.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a vehicle computing system onboard an autonomous vehicle including one or more computing devices, a message including a cryptographic signature and contextual information. The method includes determining, by the vehicle computing system, an originating sender associated with the message based, at least in part, on the cryptographic signature. The method includes determining, by the vehicle computing system, a message privilege for the message based, at least in part, on the originating sender. The message includes determining, by the vehicle computing system, a response for the contextual information based, at least in part, on the message privilege. The response is indicative of an acceptance or rejection of the contextual information. And, the method includes performing, by the vehicle computing system, a vehicle action based at least in part on the response for the contextual information.

Another example aspect of the present disclosure is directed to a vehicle computing system onboard an autonomous vehicle. The vehicle computing system includes one or more communication interfaces, one or one or more processors, and one or more tangible, non-transitory, computer readable media. The one or more tangible, non-transitory, computer readable media collectively store instructions that when executed by the one or more processors cause the vehicle computing system to perform operations. The operations include obtaining a message including a cryptographic signature and a request for access to one or more computing resources of the autonomous vehicle. The operations include determining an originating sender associated with the message based, at least in part, on the cryptographic signature.

The operations include determining a message privilege for the message based, at least in part, on the originating sender. The operations include determining a response to the request based, at least in part, on the message privilege. The response is indicative of an acceptance or rejection of the request. And, in response to accepting the request, the operations include assigning one or more computing resources of the autonomous vehicle to service the request.

Yet another example aspect of the present disclosure is directed to an autonomous vehicle including one or more vehicle communication interfaces, one or more processors, and one or more tangible, non-transitory, computer readable media. The one or more tangible, non-transitory, computer readable media collectively store instructions that when executed by the one or more processors cause the one or more processors to perform operations. The operations include obtaining a message including an origination time indicative of a time in which the message was generated and a command indicative of a task for the autonomous vehicle. The operations include determining a time-to-live interval for the message indicative of a time period after the origination time during which the message is valid. The operations include determining a pending time period for the message based on a comparison between the origination time and a current time. And, the operations include determining a response to the command based, at least in part, on the pending time period and the time-to-live interval. The response includes initiating the command or initiating one or more safety routines.

Other example aspects of the present disclosure are directed to other systems, methods, vehicles, apparatuses, tangible non-transitory computer-readable media, and devices for processing messages from a number of different process. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
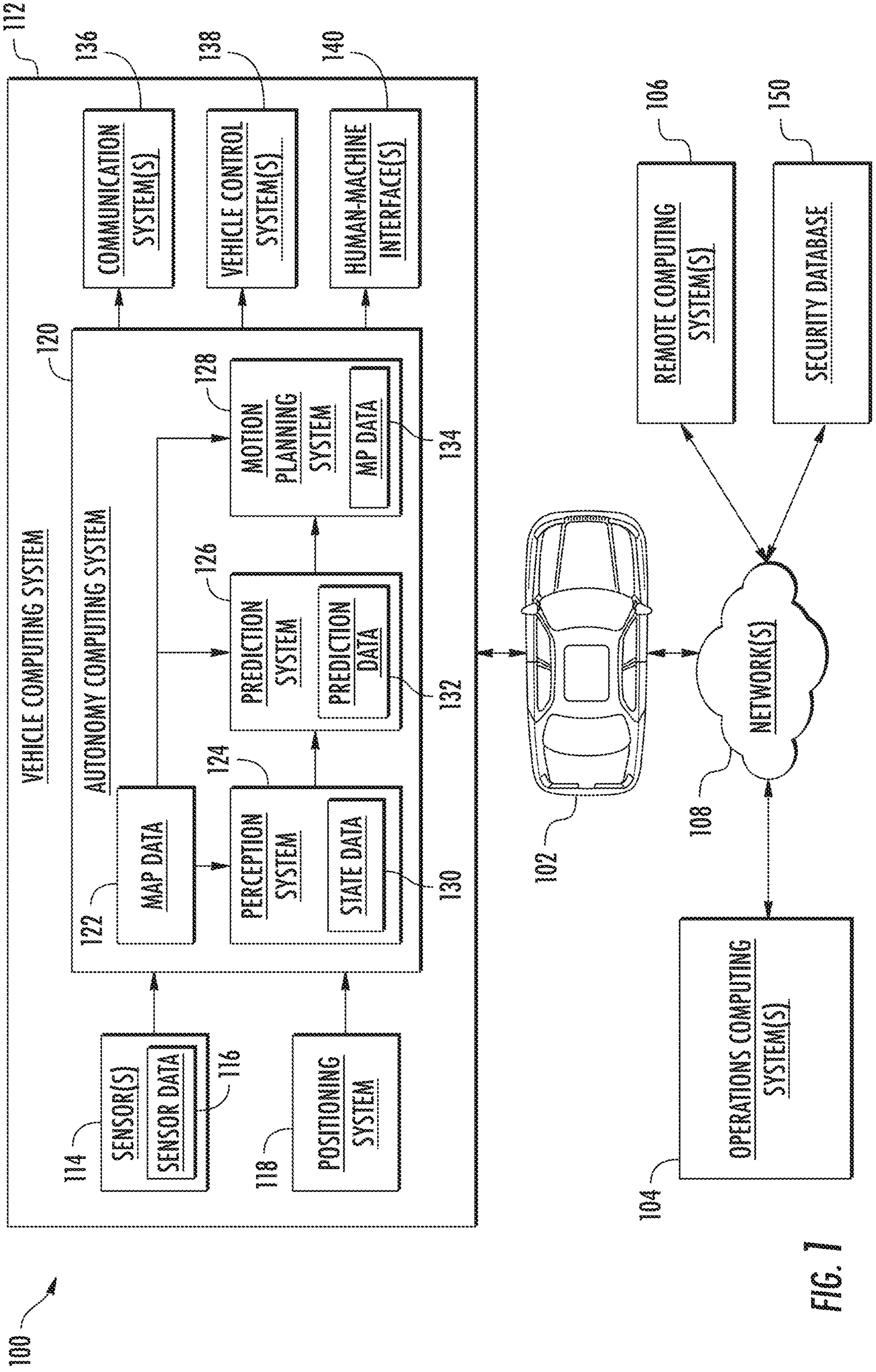
FIG. 1 depicts a diagram of an example system according to example embodiments of the present disclosure.

Aspects of the present disclosure are directed to improved systems and methods for prioritizing messages such as, for example, by prioritizing processes associated with an autonomous vehicle for access to computing resources of the autonomous vehicle. For instance, a computing system of an autonomous vehicle can include a plurality of devices (e.g., physically-connected devices, wirelessly-connected devices, virtual devices running on a physical machine, etc.). The computing devices can be associated with, for example, the vehicle's onboard computing system, a laptop/computer utilized by a vehicle operator, an onboard tablet accessible by a rider, etc. Each device can include a compute node configured to run one or more processes. In some implementations, a process can include a plurality of function nodes (e.g., pure functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks).

A vehicle computing system can receive a plurality of messages from the plurality of processes running on the plurality of devices. Each message can include a signature generated by the process that generated the message (e.g., an originating process) and contextual information (e.g., object data, weather data, location data, etc.), a request for access to computing resources (e.g., hardware resources such as communication interfaces, processors, etc., software resources such as one or more processes, etc.), and/or a command (e.g., to initiate safety procedures, to continue operation, etc.). The vehicle computing system can assign a privilege level to each message based on one or more aspects of the message (e.g., an originating sender, message type, routing history annotation, priority, timing, user privilege, etc.). For example, the vehicle computing system can determine the privilege level based on an originating sender (e.g., a process that generated the message) of the message. A process can be associated with a privilege level (e.g., based on reliability, safety, associated user, etc.) relative to the other processes (e.g., vehicle processes running on vehicle devices, remote processes running on remote devices, etc.). For instance, an operator override process can be associated with a higher privilege level than a motion planning process in the event that an operator of a vehicle (e.g., interacting with the operator override process) is to undertake control of the autonomous vehicle's motion. Moreover, a process running on a first user device can be associated with a higher privilege level relative to processes running on another user device based on the user associated with the first user device. For example, the user of the first user device can be assigned the higher privilege level in response a determination that the user should be afforded a higher communication priority (e.g., by paying an additional charge for a transportation service offered by the autonomous vehicle, by having a higher user rating, by being a more frequent rider, etc.).

The vehicle computing system can determine a response to the message based on the content of the message (e.g., contextual information, request, command, etc.) and the message privilege. In response to a message containing contextual information, the vehicle computing system can determine whether to use the contextual information of the message over contextual information offered by other messages based on the message's privilege level relative to the other messages. As an example, in the event that an operator override process and an object detection process offer conflicting contextual information to be used in determining a motion plan for the vehicle, the vehicle computing system can utilize the contextual information from the higher privileged operator override process and ignore the conflicting contextual information offered by the lower privileged object detection process. For example, in a testing environment, the autonomous vehicle could perceive a traffic light signal as one state and an onboard human operator could perceive the traffic light signal in another state and send a message indicative of the state to override the vehicle's perception. In response to a message containing a request for access to computing resources, the vehicle computing system can determine whether to assign computing resources and/or which computing resources of the autonomous vehicle to assign to service the request based on the message's privilege. As an example, the vehicle computing system can assign higher end computing resources (e.g., a faster router for internet access onboard the autonomous vehicle, an application for streaming content, etc.) of the autonomous vehicle to service message requests from a first user who pays an additional charge for a vehicle transportation service over message requests from nonpaying users. In this manner, the vehicle computing system can efficiently prioritize messages based on content and one or more aspects of the message. This, in turn, allows a vehicle computing system to prioritize conflicting information offered by different messages based on the reliability of the message as indicated by different aspects of the message. Prioritizing messages enables the vehicle computing system to share common computing resources, such as communication interfaces (e.g., routers, modems, etc.), of an autonomous vehicle in accordance with the message's privilege. In this manner, the vehicle computing system can better allocate the utilization of common communication infrastructure onboard the autonomous vehicle.

The following describes the technology of this disclosure within the context of an autonomous vehicle for example purposes only. As described herein, the technology described is not limited to autonomous vehicles and can be implemented within other robotic and vehicle computing systems, such as human-operated vehicles, remotely controlled vehicles, etc.

An autonomous vehicle (e.g., ground-based vehicle (e.g., bikes, scooters, and other light electric vehicles, etc.), air-based vehicles (e.g., vertical takeoff and landing (VTOL) vehicle), water-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment.

As discussed in further detail below, the autonomous vehicle can include a plurality of computing resources that facilitate the operation of the vehicle. The computing resources, for example, can include a plurality of hardware resources such as, for example, processors, a common communication infrastructure (e.g., a plurality of communication interfaces including routers, modems, terminals, switches, gateways, etc.), one or more memory devices, vehicle sensors, etc. and/or a plurality of software resources such as, for example, one or more applications, processes, etc. running on and/or accessible to the autonomous vehicle. In some implementations, each computing resource can be devoted to one or more subsystems of the autonomous vehicle (e.g., vehicle computing system, etc.) and/or one or more remote device(s) communicatively connected to the autonomous vehicle. In addition, or alternatively, the one or more subsystems of the autonomous vehicle (e.g., vehicle computing system, etc.) and/or remote devices communicatively connected to the autonomous vehicle can be configured to share the plurality of computing resources. In such a case, it may be beneficial to control access to the plurality of computing resources by prioritizing messages received from each subsystem and/or remote device.

For instance, the autonomous vehicle can include a vehicle computing system with a variety of components for operating with minimal and/or no interaction from a human operator. The vehicle computing system can be located onboard the autonomous vehicle and include one or more sensors (e.g., cameras, Light Detection and Ranging (LIDAR), Radio Detection and Ranging (RADAR), etc.), a positioning system (e.g., for determining a current position of the autonomous vehicle within a surrounding environment of the autonomous vehicle), an autonomy computing system (e.g., for determining autonomous navigation), a communication system (e.g., for communicating with the one or more remote computing systems), one or more vehicle control systems (e.g., for controlling braking, steering, powertrain), a human-machine interface, etc.

The autonomy computing system can include a number of sub-systems that cooperate to perceive the surrounding environment of the autonomous vehicle and determine a motion plan for controlling the motion of the autonomous vehicle. For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle.

The vehicle computing system can communicate with a remote computing system such as, for example, an operations computing system and/or one or more remote devices that are not included in the vehicle's computing system (e.g., operator devices, user devices, developer devices, bench devices, simulation devices, etc.) via the communication system onboard the vehicle. The operations computing system can be associated with a service entity that provides one or more vehicle services. The operations computing system can include various sub-systems/back-ends that are configured to perform various functions. For example, the operations computing system can be configured to receive (e.g., via a matching/deployment system back-end) a service request for a vehicle service, determine (e.g., via a routing system back-end) a vehicle route based on the service request, identify (e.g., via a matching/deployment system back-end) the autonomous vehicle to perform at least a portion of the vehicle route, etc.

By way of example, the autonomous vehicle can be associated with a service provider configured to provide a vehicle service. The service provider can be associated with a plurality of different vehicles (e.g., the autonomous vehicle) that can be utilized to provide the vehicle service for one or more users of the service provider. For instance, the service provider can include a ride-share service provider configured to provide a ride-sharing service for one or more users of the service. In this regard, the service provider can be associated with a plurality of users that can interact (e.g., schedule, request, accept, etc.) with the service provider to obtain a transportation service.

For example, each of the plurality of users can be associated with a respective user device (e.g., smartphone, tablet, hand-held computing device, wearable computing device, embedded computing device, navigational computing device, etc.). The user device can include a user software application that runs on the user device and, in some implementations, a request for a transportation service can be generated and communicated to the service provider via the user software application. In addition, or alternatively, each user can be associated with a user account for the service provider. The user account can include information for the respective user such as, for example, one or more locations (e.g., a home address, a work address, etc.), a user rating (e.g., a reliability rating, etc.), a user status (e.g., gold, medallion, etc.), a number of trips taken, etc. The computing system of the present disclosure can include any combination of the vehicle computing system, one or more subsystems and/or components of the vehicle computing system, one or more remote computing systems such as the operations computing system, one or more components of the operations computing system, and/or other remote computing devices. For example, each vehicle sub-system can include one or more vehicle device(s) and each remote computing system/device can include one or more remote devices. The plurality of devices of the computing system of the present disclosure can include one or more of the one or more vehicle device(s) (e.g., internal devices) and/or one or more of the remote device(s).

For instance, the plurality of devices of the present disclosure can include one or more devices configured to communicate over one or more wired and/or wireless communication channels (e.g., wired and/or wireless networks). Each device can be associated with a type, an operating system, and/or one or more designated tasks. A type, for example, can include an indication of the one or more designated tasks of a respective device. The one or more designated tasks, for example, can include performing one or more processes and/or services of the computing system.

Each device of the plurality devices can include and/or have access to one or more processors and/or one or more memories (e.g., RAM memory, ROM memory, cache memory, flash memory, etc.). The one or more memories can include one or more tangible non-transitory computer readable instructions that, when executed by the one or more processors, cause the device to perform one or more operations. The operations can include, for example, executing one or more of a plurality of processes of the computing system. For instance, each device can include a compute node configured to run one or more processes of the plurality of processes. In some implementations, a process can include a plurality of function nodes (e.g., pure functions) connected by one or more directed edges that dictate the flow of data between the plurality of function nodes. A device can execute (e.g., via one or more processors, etc.) a respective plurality of function nodes to run a respective process.

For example, the plurality of function nodes can be arranged in one or more function graphs. A function graph can include function nodes arranged (e.g., by one or more directed edges) in a pipeline, function graph, etc. The function nodes can include a computing function with one or more inputs (e.g., of one or more data types) and one or more outputs (e.g., of one or more data types). For example, the function nodes can be implemented such that they define one or more accepted inputs and one or more outputs. In some implementations, each function node can be configured to obtain one or more inputs of a single data type, perform a single function, and output one or more outputs of a single data type.

The series of function nodes can be connected by one or more directed edges of a function graph, a subgraph of the function graph, etc. The one or more directed edges can dictate how data flows through the function graph, subgraph, etc. For example, the one or more directed edges can be formed based on the defined inputs and outputs of each of the function nodes of the function graph. Each function graph can include an injector node and an ejector node configured to communicate with one or more remote devices and/or processes outside the function graph. The injector node, for example, can be configured to communicate with one or more devices (e.g., sensor devices, etc.) and/or processes outside the function graph to obtain input data for the function graph. The ejector node can be configured to communicate with one or more devices and/or processes outside the function graph to provide output data of the function graph to the one or more devices and/or processes.

A device can be configured to execute one or more function graphs to run one or more processes of the plurality of processes. A process can include an executed instance of a function graph and/or a subgraph of a function graph. For example, in some implementations, a function graph can be separated across multiple processes, each process including a subgraph of the function graph. In such a case, each process of the function graph can be communicatively connected by one or more function nodes of the function graph. In this manner, a respective device can be configured to run a respective process by executing a respective function graph and/or a subgraph of the respective function graph. Thus, each function graph can be implemented as a single process or multiple processes. In some implementations, one or more of the plurality of processes can include containerized services (application containers, etc.). For instance, each process can be implemented as a container (e.g., docker containers, etc.). For example, the plurality of processes can include one or more containerized processes abstracted away from an operating system associated with each respective device. Although a function graph architecture is described herein with respect to processes, the processes are not limited to such an architecture. For example, the processes running on a user device (e.g., an onboard tablet) may utilize a different software architecture.

The plurality of processes (e.g., of each respective device) can be communicatively connected over one or more wireless and/or wired networks. For instance, the plurality of processes can communicate over one or more communication channels. Process(es) can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system).

The vehicle computing system can receive a plurality of messages (e.g., via one or more internal communications interfaces, external communications interfaces, etc.) from the plurality of processes running on the one or more of devices of the computing system (e.g., internal devices, remote devices, etc.). For example, the vehicle computing system can receive the plurality of messages from the one or more internal (e.g., vehicle computing devices) and/or remote (e.g., user device(s), operational computing systems, etc.) computing devices. Each message of the plurality of messages can include a signature and contextual information, a request for access to one or more computing resources of the vehicle, and/or a command indicative of a task for the vehicle.

In some implementations, the contextual information can include data indicative of one or more aspects of a surrounding environment of the autonomous vehicle. For example, the contextual information can include an indication of the presence of an object (e.g., static object(s) such as roadways, buildings, signs, etc., dynamic object(s) such as pedestrians, other vehicles, etc., etc.) within the surrounding environment of the autonomous vehicle, a state of the object (e.g., the status of a traffic light (e.g., red, yellow, green), etc.), environmental information (e.g., weather information (e.g., rain, snow, etc.), lighting information (e.g., low light conditions while the vehicle is operating at night, in a tunnel, etc., high light conditions while the vehicle is operating during the day, etc.).

In addition, or alternatively, the contextual information can include assignment information indicative of one or more assignments for the autonomous vehicle. The assignment information can include ride-share information such as, for example, one or more times for beginning and/or completing a transportation service, one or more users for the transportation service, one or more locations (e.g., a pick-up/drop-off location, etc.) for the transportation service, etc.

The vehicle computing system can obtain a message including the contextual information and reason about the surrounding environment of the autonomous vehicle and/or a vehicle assignment for the autonomous vehicle based on the contextual information. The vehicle computing system can perform one or more vehicle functions based on the surrounding environment reasoning and/or the vehicle assignment reasoning. For example, the vehicle computing system (e.g., a motion planning system, etc.) can generate a motion plan for the autonomous vehicle based on the contextual information (e.g., perform a stop operation at a red light, perform a pick-up operation at a pick-up location, etc.).

The plurality of messages can also include one or more messages containing a request for access to one or more computing resources. The request for access to one or more computing resources can include, for example, a request for access to one or more processors of the autonomous vehicle to perform an operation of the message, a request for access to one or more common communication interfaces of the autonomous vehicle to access one or more remote services (e.g., Internet services, etc.), a request for access to one or more memory devices of the autonomous vehicle to store data, a request for access to one or more applications running on the autonomous vehicle, etc. By way of example, one or more processes onboard the vehicle and/or remote from the vehicle can request access to one or more communication interfaces (e.g., routers, modems, terminals, etc.) of the autonomous vehicle to facilitate an establish and facilitate an Internet connection. The vehicle computing system can obtain the message including such a request and assign one or more communication interfaces of the autonomous vehicle to service the request. In this manner, the vehicle computing system can utilize one or more shared communication interfaces onboard the autonomous vehicle to connect one or more vehicle devices and/or remote device (e.g., user devices) to the Internet.

In addition, or alternatively, one or more message(s) of the plurality of messages can include a command. The command can include data indicative of a task for the autonomous vehicle. The command, for example, can include a request to receive vehicle health information (e.g., a health check), a confirmation to continue online operation in response to a vehicle request to continue online operation, a request to initiate one or more safety operations, etc. By way of example, the vehicle computing system can be configured to communicate with one or more remote devices (e.g., of the operations computing system) to ensure one or more systems onboard the vehicle are functioning properly. In some implementations, the vehicle computing system can be configured to receive continuous, periodic, scheduled, etc. messages from the one or more remote devices including commands to continue operation and/or to initiate one or more safety routines.

The vehicle computing system can determine any number of responses to each of the plurality of messages depending on the content of the message (e.g., contextual information, request, command, etc.) and/or one or more aspects of the message. For example, the vehicle computing system can determine a response to each of the plurality of messages based on a message privilege associated with the message. The message privilege, for example, can be based on an originating sender, message type, routing history annotation, priority, timing, user privilege, etc. associated with the message.

For example, the vehicle computing system can determine a message privilege for a message based on an originating sender of the message. The originating sender, for example, can be indicative of a process that generated the message. For instance, as described above, the originating sender can include an internal and/or remote process of the vehicle computing system. Each process can be associated with a process-specific identity. The process can generate a message for the vehicle computing system and sign the message with the process-specific identity. In this manner, the vehicle computing system can determine the originating sender based on a signature of the message. The vehicle computing system can determine the message privilege for the message based on the originating sender.

In some implementations, the vehicle computing system can determine the originating sender based, at least in part, on a cryptographic signature associated with the message. For example, the message can include a cryptographic signature. The cryptographic signature, for example, can include the process-specific identity (e.g., an identity associated with the related/originating process) encrypted by one or more cryptographic keys. The process-specific identity can include, for example, a process identifier unique to the process. For instance, the cryptographic signature can be previously generated for the message by the originating sender using one or more cryptographic signing schemes. In such a case, the vehicle computing system can identify the originating sender by decrypting the encrypted signature (e.g., using a corresponding cryptographic signing scheme).

As an example, the vehicle computing system can decrypt the encrypted signature by obtaining a cryptographic key associated with the message and/or the originating sender of the message. In addition, or alternatively, the vehicle computing system can determine a validity of the message based on the cryptographic signature and the cryptographic key. For example, the vehicle computing system can attempt to decrypt (e.g., reconfigure) the signature using the cryptographic key. The vehicle computing system can determine that the cryptographic signature is valid in the event that the decrypted signature identifies a known process. In addition, or alternatively, the vehicle computing system can determine that the cryptographic signature is invalid in the event that the decrypted signature fails to identify a process known to the vehicle computing system.

By way of example, the cryptographic signature can be generated by the originating sender based on a symmetric signing scheme. For instance, the signature can be previously generated for the message by the originating sender based on the one or more shared secrets. For example, the one or more shared secrets can include one or more symmetric private keys (e.g., a 256 bit AES key, etc.) known by the vehicle computing system and the remote process.

The originating process can sign the message with the process-specific identity and encrypt the process-specific identity with the symmetric private key to generate a cryptographic signature. The signed message can be provided the vehicle computing system. The vehicle computing system can identify the cryptographic signature and, in response, receive a corresponding symmetric private key stored at the vehicle computing system (e.g., one or more memory device (s) of the vehicle computing system). The vehicle computing system can decrypt the cryptographic signature of the message with the corresponding symmetric private key and identify the originating sender based, at least in part, on the decrypted signature.

As another example, the cryptographic signature can be generated by the originating sender based on an asymmetric signing scheme. For example, a remote security database (e.g., one or more remote servers with one or more security services running therein) can be configured to generate a root certificate and a private key corresponding to the root certificate. The root certificate can include a publicly accessible key corresponding to the private key such that a signature encrypted by the private key can be decrypted by the public key, and/or vice versa. The remote security database can utilize the root certificate and/or private key to sign an intermediate certificate associated with one or more intermediate signing services running at the security database and/or on one or more internal and/or remote devices. The intermediate signing services can utilize the intermediate certificate to sign operational certificates for one or more processes running at the security database and/or internal and/or remote devices. In this manner, a certificate authority chain can be created in which one or more processes running at the security database and/or internal and/or remote devices are authorized by an intermediate certificate that derives authority from the root certificate.

The security database can provide asymmetric keys (e.g., intermediate certificates signed using the root certificate and corresponding private keys) to one or more signing services for each of the plurality of devices. The signing services can generate operational certificates for a process running on the device, sign the operational certificate, and encrypt the signature with the private key corresponding to the intermediate certificate. The service can generate a message including the signed operational certificate and send the message to the vehicle computing system. The vehicle computing system can receive the message and identify the signing service that signed the operational certificate of the message. The vehicle computing system can obtain the intermediate certificate (e.g., including the public key corresponding to the private key) of the signing service from the security database and decrypt the cryptographic signature of the operational certificate using the public key of the intermediate certificate. The vehicle computing system can identify the originating sender based on the decrypted signature.

The vehicle computing system can determine the message privilege for the message based on the identified originating sender. For example, in some implementations, each respective process of the plurality of processes running on the one or more internal or remote devices can be associated with one or more process message privileges. The one or more process message privileges can be indicative of a reliability of the process, a trustworthiness of the process, a length of operation of the process, etc. For example, a process running onboard the autonomous vehicle can be associated with an error rate indicative of the accuracy of the contextual information generated by the process. In some implementations, the error rate can be improved based on the length of operation of the process (e.g., the process can utilize machine learned models that improve over time, etc.) such that the process message privilege of the process can increase over time. Moreover, in some implementations, one or more processes can be inherently reliable (e.g., remote override processes overseen by remote vehicle operators), whereas other processes can be inherently unreliable (e.g., processes undergoing validation testing, etc.). In such a case, the process message privilege for the process can be based on the inherent reliability of the process.

The vehicle computing system can determine the message privilege for the message based on the one or more process message privileges associated with the originating sender. For example, the vehicle computing system can determine a higher message privilege for a message associated with an originating sender that is inherently reliable such as, for example, a remote override process relative, than a message associated with an originating sender that may be considered less reliable such as, for example, unvalidated processes. In this manner, the message privilege for the message can be determined based on the reliability of the process that generated the message.

In addition, or alternatively, the vehicle computing system can determine the message privilege for the message based on a message type of the message. For example, the vehicle computing system can determine a message type for the message based on the content of the message. By way of example, the message type can include a respective message type of a plurality of predefined message types. The plurality of message types can be indicative of a type of contextual information of the message, a type of request of the message, the type of command of the message, etc. For example, a message including contextual information indicative of an object within the surrounding environment of the vehicle can be assigned a perception message type, a message including contextual information indicative of a future location of the object can be assigned a prediction message type, a message including contextual information indicative of a hazardous condition can be assigned a safety message type, a message including a request for access to computing resources of the vehicle can be assigned a request message type, etc.

The vehicle computing system can determine a message privilege for the message based on the message type. For example, the vehicle computing system can determine a higher message privilege for messages assigned a safety message type relative to other message types. By way of example, a message including contextual information identifying a hazardous condition (e.g., ice on the roadway, a pedestrian jay-walking, etc.) can be assigned a higher message privilege than a message including a request for access to computing resources (e.g., for Internet connectivity, etc.). In this manner, the vehicle computing system can encourage vehicle safety by prioritizing the processing of safety messages over less immediately critical messages.

In some implementations, the vehicle computing system can determine the message privilege for the message based on a comparison of the message type and the originating sender. For example, the one or more process message privileges associated with an originating sender can include a respective message privilege for one or more message types. By way of example, in a testing environment, a perception process can have a high process message privilege for perception type messages (e.g., contextual information indicative of an irregular object within the surrounding environment of the autonomous vehicle that the vehicle may have requested clarification due to lower confidence levels, etc.) and/or a low process message privilege for vehicle action type messages because these types of message may not be what is expected from the perception process (e.g., contextual information indicative of a recommended vehicle action, etc.). In this way, the vehicle computing system can prioritize messages based on the reliability of the originating sender with respect to the message type. For example, a perception process can historically provide less reliable vehicle action data than a vehicle action process, and/or vice versa.

In addition, or alternatively, the vehicle computing system can determine message privilege for the message based on a route history of the message. For example, a message can include a route history indicative of one or more intermediary processes of the plurality of processes. The one or more intermediary processes can include processes that have received the message before the intended recipient. For example, a message can be generated by the originating sender and provided to an intended recipient process. Before reaching the intended recipient process, the message can be routed through one or more intermediary processes. By way of example, a perception process can generate a message intended for a motion planning process, the message can be received by one or more intermediary processes (e.g., other perception processes, communication processes, etc.) en route to the motion planning process, and rerouted to the motion planning process by the one or more intermediary processes. In some implementations, the one or more intermediary processes can be configured to annotate the message with a process-specific identity before rerouting the message to the intended process.

In such a case, the message privilege for the message can be determined on the route history and/or the one or more intermediary processes of the route history. By way of example, one or more aspects (e.g., length, number of intermediary processes, etc.) of the route history can decrease the reliability of the message. The vehicle computing system can determine the message privilege for the message based on the length and/or number of intermediary processes identified by the route history. For example, a message associated with a long route history can be assigned a lower privilege than another message associated with a short route history.

In addition, or alternatively, the vehicle computing system can determine the message privilege for the message based on the identity of one or more intermediary processes of the route history associated with the message. For example, one or more intermediary processes of the route history can be associated with an insecure communication channel and/or can have a history of corrupting messages. A message associated with a route history with one or more insecure intermediary processes can be assigned a lower privilege than messages with a route history without one or more insecure intermediary processes. In this manner, the vehicle computing system can determine a message privilege for the message based on the integrity of the communication channels with which the message reached the vehicle computing system.

In addition, in some implementations, the vehicle computing system can determine the message privilege based on one or more times associated with the message. For instance, the vehicle computing system can determine an origination time associated with the message. The origination time, for example, can be indicative of a time in which the message was generated by the originating sender. In some implementations, the message can include the origination time. For instance, the message can include a time stamp indicative of the time in which it was generated. By way of example, in some implementations, the originating sender can be configured to generate the message and a time stamp to establish a time of generation of the message. The originating sender can include the time stamp with the message.

In some implementations, the vehicle computing system can determine the message privilege for the message based on a comparison of the origination time and a current time. For example, the vehicle computing system can obtain a current time indicative of a time in which the message is obtained. By way of example, the vehicle computing system can include one or more timing devices (e.g., internal clock, timer, etc.) configured to maintain a current time onboard the vehicle. The vehicle computing system can receive the message, obtain the current time from the one or more timing devices, and associate the message with the current time.

The vehicle computing system can determine a message privilege for the message based on a pending time after the origination time. For example, the vehicle computing system can determine a pending time period for the message based on a comparison of the origination time and the current time. The pending time period, for example, can be indicative of a time period after the origination time. In some implementations, the reliability of a message can decrease over time. For example, a message can include contextual information indicative of an object within the surrounding environment of the vehicle at a particular time. The likelihood that the object is still within the surrounding environment of the vehicle can decrease as time passes the particular time. For example, the object and/or the autonomous vehicle can move over time decreasing the likelihood that the object remains within the surrounding environment of the autonomous vehicle. The vehicle computing system can determine the message privilege for the message such that the message privilege can decrease as the pending time period increases.

In addition, or alternatively, the message can be associated with a reliability time threshold indicative of a period of time after the origination time for which the contextual information of the message is reliable. The reliability time threshold can be included in the message. In addition, or alternatively, the vehicle computing system can determine the reliability time threshold based, at least in part, on one or more aspects of the message (e.g., originating sender, contextual information, etc.). For example, a longer reliability time threshold can be determined for prediction data indicative of the presence of an object at a future time than for perception data indicative of the presence of the object at the current time.

The vehicle computing system can determine a message privilege for the message based on the reliability time threshold. For example, the vehicle computing system can determine the message privilege based on a comparison of the pending time and the reliability time. For instance, the vehicle computing system can determine a higher message privilege for a message associated with a pending time less than a reliability time threshold relative to a message associated with a pending time over a reliability time threshold. In this manner, the vehicle computing system can assign a higher privilege to messages from a less reliable source but received within a reliable time period than messages from a reliable source received after a reliable time period. By way of example, the vehicle computing system can receive a message from a reliable remote override process including contextual information indicating that a traffic light was red five seconds ago. At the same time, the vehicle computing system can receive a message from a perception process indicating that the traffic light is currently green. In such a case, the vehicle computing system can assign a higher privilege to the message from the perception process even in the event that the perception process is less reliable than the remote override process because the perception process's message was received within a reliability time threshold and the remote override process's message was not.

In some implementations, the originating sender can include a process running on one or more user computing devices. The one or more user computing devices can include, for example, one or more computing devices associated with at least one user of the service provider associated with the autonomous vehicle. In such a case, the vehicle computing system can determine a message privilege for the message based on a user privilege associated with the one or more user computing devices. For example, each of the one or more user computing devices can be associated with one or more user privileges. By way of example, a user privilege for a user computing device can be based on a user account associated with the user of the user computing device, a transportation service purchased by the user, etc.

As an example, a user can be associated with a user account indicative of one or more characteristics of the user. In some implementations, the vehicle computing system can determine one or more user privileges for the user based on the one or more characteristics of the user (e.g., as indicated by the user account). For instance, a user account with a long history with the service provider (e.g., based on a number of trips, an age of the account, etc.) can be associated with a higher privilege than a user account with a short history with the service provider. In addition, or alternatively, a user account with a high user rating (e.g., based on the user's behavior during previous services provided to the user, etc.) can be associated with a higher privilege relative to a user account associated with a low user rating. In this manner, a user's privilege can depend on a user's loyalty to the service provider, behavior during services provided by service provider, etc.

The vehicle computing system can determine message privilege for a message from a process running on a user device based on the user privileges associated with the user of the user device. For instance, the message privileges can mirror the user privileges associated with the user. In this manner, a message received from a user device associated with a high user privilege can be serviced before a message received from a user device associated with a lower user privilege.

In addition, or alternatively, the one or more user privileges can be determined by the vehicle computing system based on a current transportation service for the user. For example, the message can be received by the vehicle computing system from an originating sender running on a user device during a transportation service for the user of the user device. In such a case, the vehicle computing system can determine a user privilege for the user based on one or more characteristics of the current transportation service. The one or more characteristics can include, for example, a purchase price, a service package, a user status, one or more additional charges, etc. By way of example, the vehicle computing system can determine a privilege for a message received from a user device based on a service purchased by the user of the user device. In this manner, a user can pay an additional charge to receive a higher privilege during the vehicle service.

The vehicle computing system can determine a response to the message based on one or more aspects of the message. The response can be determined based on, for example, the content of the message, the message privilege assigned to the message, and/or a time-to-live associated with the message. For example, the vehicle computing system can determine a different response for a message based on the content of the message. By way of example, the vehicle computing system can determine a first response for contextual information of a message, a second response for a request of the message, and/or a third response for a command of the message.

For example, the vehicle computing system can determine a response for contextual information of a message based on the message privilege. The response can be indicative an acceptance or a rejection of the contextual information. By way of example, a response indicative of an acceptance of the contextual information can utilize the contextual information in one or more vehicle reasoning processes, whereas a response indicative of a rejection of the contextual information can ignore the contextual information during one or more vehicle reasoning processes. For example, a first message can include contextual information that contradicts contextual information provided by a second message. The vehicle computing system can determine a message privilege for the first and second message, in the manner described above, and determine a response to the conflicting contextual information based on the respective message privilege for each message. For example, the vehicle computing system can compare the first message privilege to the second message privilege, accept the contextual information provided by the message associated with the higher privilege, and ignore the contextual information provided by the message associated with the lower privilege.

In some implementations, the response can be determined based on a contextual privilege threshold. For example, the vehicle computing system can be configured to ignore the contextual information of any message associated with a message privilege below the contextual privilege threshold. The vehicle computing system can determine the contextual privilege threshold based on the reasoning process for which the contextual information can be used. By way of example, the vehicle computing system can determine a higher contextual privilege threshold for contextual information used in one or more safety critical decisions (e.g., determining a safety stop, generating a motion plan, etc.), whereas a lower contextual privilege threshold can be determined for non-safety critical decisions (e.g., logging metrics data, etc.).

The vehicle computing system can perform a vehicle action based on the response to the contextual information. For example, the vehicle computing system can determine whether to utilize the contextual information in one or more reasoning processes for the surrounding environment of the autonomous vehicle. By way of example, the vehicle computing system can identify and/or determine the presence and/or state of one or more objects within the surrounding environment of the autonomous vehicle based on the response to the contextual information. As an example, in some implementations, the vehicle computing system can determine one or more vehicle actions (e.g., in accordance with a motion plan, avoidance maneuver, safety maneuver, etc.) based on the response contextual information.

The vehicle computing system can determine another response to a request for access to computing resources included in a message based on the message privilege. For example, the response can be indicative of an acceptance of the request or a rejection of the request to grant access to one or more computing resources of the autonomous vehicle. The vehicle computing system can grant access to the one or more computing resources of the autonomous vehicle in the event that the response is indicative of an acceptance and refuse to grant access to the one or more computing resources of the autonomous vehicle in the event that the request is indicative of a rejection. The vehicle computing system can determine the response based on a request privilege threshold. By way of example, the vehicle computing system can provide access to at least one of the one or more computing resources of the autonomous vehicle in the event that the message is associated with a message privilege above the response threshold.

In some implementations, the vehicle computing system can determine whether one or more of the computing resources are enabled. For example, each of one or more computing resources can be associated with resource state. The resource state can be indicative of whether the computing resource is enabled (e.g., usable by the autonomous vehicle), available, occupied, or disabled (e.g., unusable by the autonomous vehicle). By way of example, one or more computing resources (e.g., sensors, trial applications, etc.) can be disabled during testing of the autonomous vehicle and/or the one or more computing resources. The vehicle computing system can determine that at least one of the one or more computing resources of the autonomous vehicle is enabled before providing access to the at least one computing resource.

In some implementations, the vehicle computing system can provide access to at least one of the one or more computing resources of the autonomous vehicle based on the acceptance, the message privilege, and/or whether the at least one computing resource is enabled. For example, the vehicle computing system can facilitate one or more message queues. Each of the one or more message queues can include an ordered list of pending messages based on the message privilege of each of the pending messages. In the event that the vehicle computing system accepts the message, the vehicle computing system can supplement at least one of the one or more message queues with the message based on the message privilege. In the event that the message requests a disabled computing resource, the vehicle computing system can ignore the request, deny the request, and/or response with a disabled message indicating that the computing resource is disabled.

For example, in some implementations, each of the one or more message queues can be associated with at least one communication interface (e.g., a modem, router, terminal, etc.) of one or more communication interfaces of a common communication infrastructure onboard the autonomous vehicle. Each message queue, for example, can be associated with a respective communication interface onboard the autonomous vehicle. The message queue can include an ordered list of pending messages to be serviced by the respective communication interface.

The vehicle computing system can add a message to a respective message queue based on the message privilege. By way of example, each message queue can be associated with a privilege threshold, such that only messages associated with a message privilege over the privilege threshold are added to the respective message queue. In some implementations, each message queue can be associated with a communication interface based on the privilege threshold. For example, a message queue with a high privilege threshold can be associated with one or more higher end communication interfaces (e.g., that offer faster connection speeds due to more bandwidth, etc.). In this manner, computing resources of a shared communications infrastructure can be allocated to messages based on a privilege associated with the message.

The vehicle computing system can determine another response to a command included in a message. The response can be determined, for example, based on one or more factors such as, for example, the pending time period, a time-to-live interval, and the command. The response can include initiating the command and/or initiating one or more safety routines.

By way of example, the vehicle computing system can determine a time-to-live interval for the message. The time-to-live interval can be indicative of a time period after an origination time for the message during which the message is valid. In some implementations, the message can include an indication of the time-to-live interval.

In addition, or alternatively, the vehicle computing system can determine the time-to-live interval for the message based one or more factors associated with the message privilege. For example, the time-to-live interval can be determined based on the task requested by the command (e.g., a command type). By way of example, the time-to-live interval can include a time period based on a time sensitivity of the requested task. For example, the vehicle computing system can determine a short time-to-live interval for a command to change the autonomy mode of the vehicle that is based on one or more current environmental factors of the vehicle. The time-to-live interval can be short, for example, to prevent the autonomous vehicle from initiating a state change if one or more environmental factors change before the vehicle computing system receives the message. In addition, the vehicle computing system can determine a short time-to-live interval for a command in response to a safety signal provided by the vehicle. Here, the time-to-live interval can be short to identify one or more communication problems between the vehicle computing system and the originating sender of the message.

The vehicle computing system can determine the time-to-live interval for the message based on the originating sender of the message. For example, the vehicle computing system can determine a shorter time-to-live interval for messages generated by an internal process running on one or more vehicle computing devices than for messages generated by a remote process running on one or more remote computing devices, for example, to offset time lost during transmission of remote messages.

In some implementations, the vehicle computing system can adjust the time-to-live interval for the message based on environmental data. For example, the vehicle computing system can obtain environmental data indicative of a surrounding environment of the autonomous vehicle. The environmental data, for example, can include at least one of map data indicative of the surrounding environment of the vehicle, current location data indicative of the location of the autonomous vehicle within the map data, signal quality data indicative of a signal quality associated with the message and/or the current location of the vehicle, weather data indicative of the weather at the current time, etc. The vehicle computing system can modify the time-to-live interval for the message to offset any time lost due to environmental factors. By way of example, the vehicle computing system can adjust the time-to-live interval for a message sent to the vehicle when the vehicle is stuck in traffic in a tunnel where signal loss is expected. The vehicle computing system can predict the time lost in traffic based on map data, traffic data, and/or the current location of the vehicle, and adjust the time-to-live interval based on the expected time lost.

The vehicle computing system can determine a pending time period for the message based on a comparison between the origination time and the current time and determine the response to the command based, at least in part, on the pending time period. For example, the vehicle computing system can compare the pending time period to the time-to-live interval to determine the response for the command.

By way of example, in the event that the pending time period is less than the time-to-live interval, the vehicle computing system can initiate the command. In the event that the pending time period is longer than the time-to-live interval, the vehicle computing system can ignore the command and/or initiate one or more safety routines. The one or more safety routines can include one or more vehicle actions to make itself safe such as, for example, an emergency stop and/or park, a manual override, an initiation of one or more warning lights, etc. The vehicle computing system can initiate the one or more safety routines based on the task associated with the command. By way of example, the vehicle computing system can initiate one or more safety routines in the event that the command is associated with a safety critical message. A command can be associated with a safety critical message, for example, in the event that the command is indicative of a response to a safety check, a confirmation to continue online operation, etc.

The vehicle computing system can store historical message data of the message in one or more memories associated with the vehicle computing system. The historical data for example, can include at least one of the route history of the message, the content of the message, the cryptographic signature of the message, the response determined for the message, the message priority, etc. In some implementations, the vehicle computing system can analyze the historical data to improve one or more prioritizing functions described herein (e.g., through one or more machine-learning techniques, etc.).

Example aspects of the present disclosure can provide a number of improvements to communication computing technology such as, for example, message prioritizing technology for autonomous vehicles. For instance, the systems and methods of the present disclosure can provide an improved approach for prioritizing messages for use in autonomous vehicle reasoning and/or access to computing resources of the autonomous vehicle. For example, the vehicle computing system can obtain a message including a cryptographic signature, contextual information, a request for access to computing resources and/or a command. The vehicle computing system can determine an originating sender associated with the message based, at least in part, on the cryptographic signature. The vehicle computing system can determine a message privilege for the message based, at least in part, on the originating sender. The vehicle computing system can determine a response for the contextual information and/or the request for access to the computing resources based, at least in part, on the message privilege. The response can be indicative of an acceptance or rejection of the contextual information and/or request. The vehicle computing system can generate a motion plan for the autonomous vehicle based, at least in part, on the response for the contextual information. And, the vehicle computing system can assign one or more computing resources of the autonomous vehicle to service the request in response to accepting the request for access to the one or more computing resources. In this manner, the present disclosure presents an improved computing system that can effectively prioritize messages before utilizing contextual information of the message for onboard reasoning processes. The computing system employs improved prioritizing techniques that leverage different aspects of received messages to prioritize the information provided by the messages. As a result, the computing system is able utilize the most reliable information from multiple messages with conflicting information. This, in turn, can improve the safety and reliability of computing systems generally, and autonomous vehicles in particular.

Moreover, by assigning computing resources to service a message based on a message privilege, the computing system is able to isolate communications from each other within a shared communication infrastructure. In this manner, the computing system can accumulate and utilize newly available information such as, for example, message privileges to provide the practical improvement of providing separate computing resources to service a message based on the importance of the message. This, in turn, improves the functioning of communications systems in general by decreasing the overall network congestion within a shared communications infrastructure. Ultimately, the prioritizing techniques disclosed herein result in reduced network congestion; thereby increasing bandwidth available to high priority messages in autonomous vehicle computing systems.

Various means can be configured to perform the methods and processes described herein. For example, a computing system can include data obtaining unit(s), originating sender unit(s), message privilege unit(s), timing unit(s), response unit(s), motion planning unit(s), assignment unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain a message including a cryptographic signature and a request for access to one or more computing resources of the autonomous vehicle. In addition, or alternatively, the means (e.g., data obtaining unit(s), etc.) can be configured to obtain a message including a cryptographic signature and contextual information. In addition, the means (e.g., data obtaining unit(s), etc.) can be configured to obtain a message including an origination time indicative of a time in which the message was generated and a command indicative of a task for the autonomous vehicle.

The means (e.g., originating sender unit(s), etc.) can be configured to determine an originating sender associated with the message based, at least in part, on the cryptographic signature. The means (e.g., message privilege unit(s), etc.) can be configured to determine a message privilege for the message based, at least in part, on the originating sender.

The means (e.g., timing unit(s), etc.) can be configured to determining a time-to-live interval for the message indicative of a time period after the origination time during which the message is valid. The means (e.g., timing unit(s), etc.) can be configured to determine a pending time period for the message based on a comparison between the origination time and a current time.

The means (e.g., response unit(s), etc.) can be configured to determine a response for the contextual information based, at least in part, on the message privilege. The response can be indicative of an acceptance or rejection of the contextual information. The means (e.g., response unit(s), etc.) can be configured to determine a response for the request based, at least in part, on the message privilege. The response can be indicative of an acceptance or rejection of the request. The means (e.g., response unit(s), etc.) can be configured to determine a response to the command based, at least in part, on the pending time period, and the time-to-live interval. The response can include initiating the command or initiating one or more safety routines.

The means (e.g., motion planning unit(s), etc.) can be configured to generate a motion plan for the autonomous vehicle based, at least in part, on the response for the contextual information. The means (e.g., assignment unit(s), etc.) can be configured to, in response to accepting the request, assigning one or more computing resources of the autonomous vehicle to service the request.

With reference now to FIGS. 1-13, example embodiments of the present disclosure will be discussed in further detail. FIG. 1 depicts an example system 100 overview according to example implementations of the present disclosure. More particularly, FIG. 1 illustrates a vehicle 102 (e.g., ground-based vehicle, bikes, scooters, and other light electric vehicles, etc.) including various systems and devices configured to control the operation of the vehicle. For example, the vehicle 102 can include an onboard vehicle computing system 112 (e.g., located on or within the autonomous vehicle) that is configured to operate the vehicle 102. Generally, the vehicle computing system 112 can obtain sensor data 116 from a sensor system 114 onboard the vehicle 102, attempt to comprehend the vehicle's surrounding environment by performing various processing techniques on the sensor data 116, and generate an appropriate motion plan 134 through the vehicle's surrounding environment.

As illustrated, FIG. 1 shows a system 100 that includes the vehicle 102; a communications network 108; an operations computing system 104; one or more remote computing devices 106; the vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a security database 150.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices such as, for example, one or more operator devices associated with one or more vehicle operators, user devices associated with one or more vehicle passengers, developer devices associated with one or more vehicle developers (e.g., a laptop/tablet computer configured to access computer software of the vehicle computing system 112), etc. As used herein, a device can refer to any physical device and/or a virtual device such as, for example, compute nodes, a computing blades, hosts, virtual machines, etc. One or more of the devices can receive input instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more of the remote computing devices 106.

Figure 2:
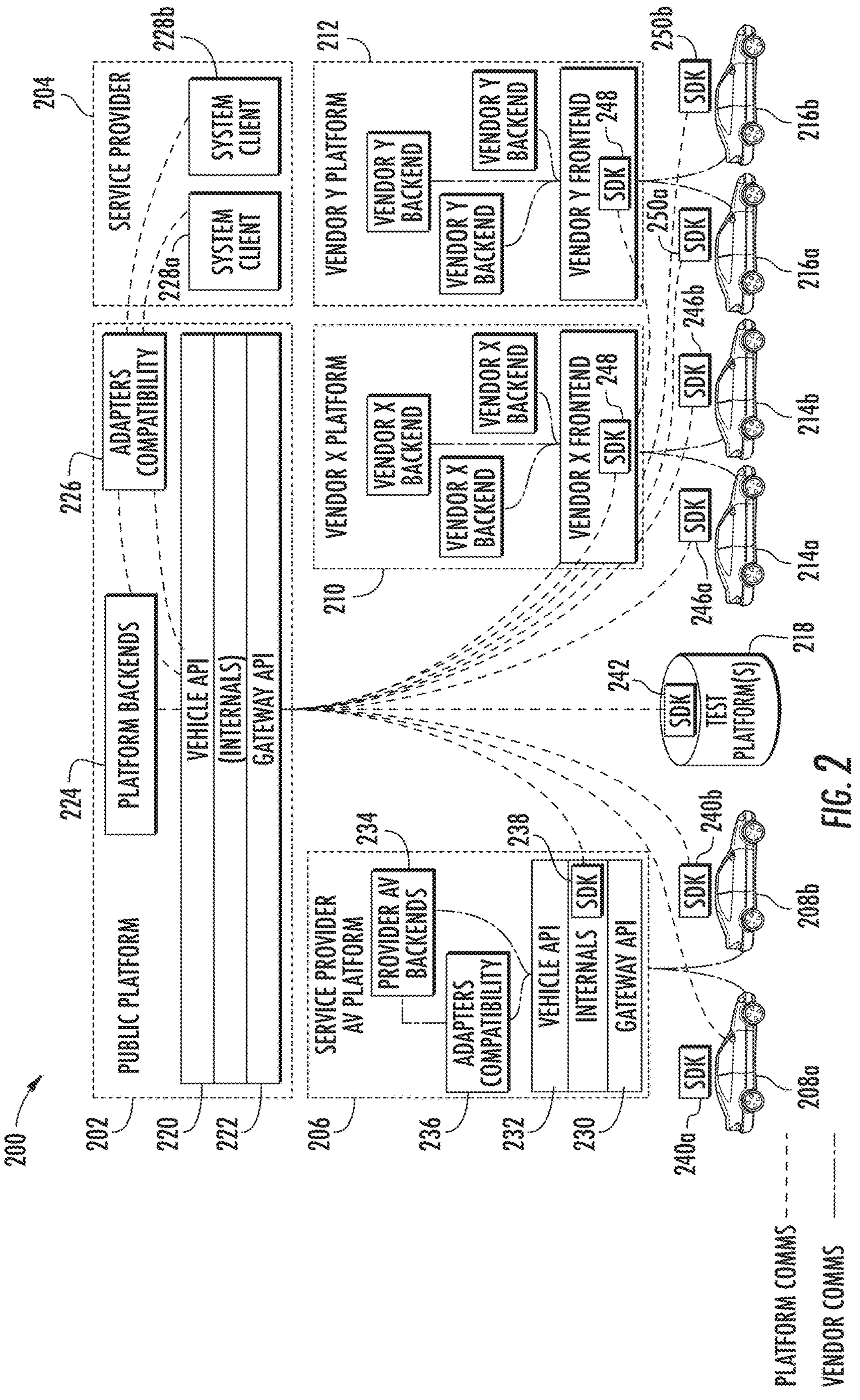
FIG. 2 depicts an example infrastructure system according to example embodiments of the present disclosure.

In some implementations, as discussed herein with reference to FIG. 2, the one or more remote computing devices can be associate with a service entity configured to facilitate a vehicle service. The one or more remote devices can include, for example, one or more operations computing devices of the operations computing system 104 (e.g., implementing back-end services of the platform of the service entity's system), one or more operator devices configured to facilitate communications between a vehicle and an operator of the vehicle (e.g., an onboard tablet for a vehicle operator, etc.), one or more user devices configured to facilitate communications between the service entity and/or a vehicle of the service entity with a user of the service entity (e.g., an onboard tablet accessible by a rider of a vehicle, etc.), one or more developer computing devices configured to provision and/or update one or more software and/or hardware components of the plurality of vehicles (e.g., a laptop computer of a developer, etc.), one or more bench computing devices configured to generate benchmark statistics based on metrics collected by the vehicle 102, one or more simulation computing devices configured to test (e.g., debug, troubleshoot, annotate, etc.) one or more components of the plurality of vehicles, etc.

In some implementations, the system 100 can include a security database 150. The security database 150 can include, for example, one or more servers communicatively connected to one or more devices (e.g., remote computing devices 106, one or more remote devices of the operations computing system 104, one or more vehicle device of the vehicle computing system 112, etc.) of the system 100. For example, the security database 150 can include one or more processors configured to perform one or more operations. In addition, the security database 150 can include one or more memories (e.g., one or more tangible, non-transitory computer readable media, etc.) configured to store security information such as for example, device credentials, user credentials, etc. For instance, the security database 150 can be associated with one or more users (e.g., users, operators/ developers of a service provider, etc.) and/or include one or more user directories including information for the plurality of users (e.g., user identity, credentials, LDAP, etc.). As discussed in further detail here, the security database 150 can be configured to generate and/or otherwise proved one or more unique device credentials to one or more devices of the system 100.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver. The vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. As discussed in further detail with reference to FIG. 3, the one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 102 (e.g., its computing system, one or more processors, and other devices in the vehicle 102) to perform operations and/or functions, including those described herein for authenticating messages between processes associated with the vehicle computing system 112.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 102. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 102. In this manner, the prediction system 126 can determine the future trajectory of the object within the surrounding environment of the vehicle 102 based, at least in part, on the machine-learned prediction generator model.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touchscreen display device associated with the one or more human-machine interfaces to indicate, for example, a stopping location for the vehicle 102.

The vehicle computing system 112 can communicate data between the vehicle 102 and the human-machine interface

140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

For example, FIG. 2 depicts an example service infrastructure 200 according to example embodiments of the present disclosure. As described below, the service infrastructure 200 can include one or more components that are included in an operations computing system 104 for providing vehicle services to one or more users of the present disclosure.

As illustrated in FIG. 2, an example service infrastructure 200, according to example embodiments of the present disclosure, can include an application programming interface platform (e.g., public platform) 202, a service entity system 204, a service entity autonomous vehicle platform (e.g., private platform) 206, one or more service entity autonomous vehicles (e.g., first party autonomous vehicles in a service entity fleet) such as autonomous vehicles 208*a* and 208*b*, and one or more test platforms 218. For example, the service entity may own, lease, etc. a fleet of autonomous vehicles that can be managed by the service entity (e.g., its backend system clients) to provide one or more vehicle services. The autonomous vehicle(s) 208*a*, 208*b* utilized to provide the vehicle service(s) can be included in this fleet of the service entity. Such autonomous vehicle may be referred to as "service entity autonomous vehicles" or "first party autonomous vehicles." Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as autonomous vehicles 214*a*, 214*b*, 216*a*, and 216*b*. For instance, the autonomous vehicle 214*a*, 214*b*, 216*a*, and 216*b* can be associated with a third party vehicle provider such as, for example, an individual, an original equipment manufacturer (OEM), a third party vendor, or another entity. These autonomous vehicles may be referred to as "third party autonomous vehicles." Even though such an autonomous vehicle 214*a*, 214*b*, 216*a*, and 216*b* may not be included in the fleet of autonomous vehicles of the service entity, the service entity infrastructure 200 can include a platform that can allow the autonomous vehicle(s) 214*a*, 214*b*, 216*a*, and 216*b* associated with a third party to still be utilized to provide the vehicle services offered by the service entity, access the service entity's system clients, and/or the like.

In some implementations, a vehicle interface platform component described herein can include one or more of the platforms and related components illustrated in the service infrastructure 200 of FIG. 2. As described herein, a service infrastructure 200 can include a public platform 202 to facilitate vehicle services (e.g., provided via one or more system clients (228*a*, 228*b*) associated with a service entity operations computing system) between the service entity infrastructure system 204 (e.g., operations computing system, etc.) and vehicles associated with one or more entities (e.g., vehicles associated with the service entity (208*a*, 208*b*), vehicles associated with third-party entities (214*a*, 214*b*, 216*a*, 216*b*), etc.). For example, in some embodiments, the public platform 202 can provide access to services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service entity infrastructure services (e.g., system clients 228*a*, 228*b*, etc.) and a vehicle API (e.g., vehicle API 220) to facilitate communication from the service entity infrastructure services (e.g., system clients 228*a*, 228*b*, etc.) to the vehicles (e.g., 208*a*, 208*b*, 214*a*, 214*b*, 216*a*, 216*b*). For example, the public platform 202, using the vehicle API 220, can query the vehicles (e.g., 208*a*, 208*b*, 214*a*, 214*b*, 216*a*, 216*b*) and/or third party systems/platforms to determine an availability (e.g., to accept a vehicle service assignment, vehicle operational capability, etc.). The vehicles and/or other systems can transmit data (e.g., availability data, operational capability data, etc.) to the public platform 202 using the gateway API 222.

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228*a* and 228*b*). A system client (e.g., 228*a*, 228*b*, etc.) can be the hardware and/or software implemented on a computing system (e.g., operations computing system of the service entity) that is remote from the vehicle and that provides a particular back-end service to a vehicle (e.g., scheduling of vehicle service assignments, routing services, payment services, user services, vehicle rating services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. A vehicle can provide a communication to the public platform 202 to call a function of a backend interface. In this way, the backend interface(s) 224 can be an external facing edge of the service entity infrastructure system 204 that is responsible for providing a secure tunnel for a vehicle and/or other system to communicate with a particular service provider system client (e.g., 228*a*, 228*b*, etc.) so that the vehicle and/or other system can utilize the backend service associated with that particular service entity system client (e.g., 228*a*, 228*b*, etc.), and vice versa.

In some embodiments, the public platform 202 can include one or more adapters 226, for example, to provide compatibility between one or more backend interfaces 224 and one or more service entity system clients (e.g., 228*a*, 228*b*, etc.). In some embodiments, the adapter(s) 226 can provide upstream and/or downstream separation between the service entity operations computing system 204 (e.g., operations computing system 104, system clients 228*a*, 228*b*, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228*a*, 228*b*) associated with the service entity operations computing system (e.g., operations computing system 104, etc.) between the service entity infrastructure system 204 and vehicles associated with the service entity (e.g., vehicles 208*a*, 208*b*). For example, in some embodiments, the private platform 206 can provide access to service entity services that are specific to the service entity vehicle fleet (e.g., first party autonomous vehicles 208*a* and 208*b*) such as fleet management services, autonomy assistance services, and/or the like.

The private platform 206 can include a gateway API (e.g., gateway API 230) to facilitate communication from the vehicles 208*a*, 208*b* to one or more service entity infrastructure services (e.g., via the public platform 202, via one or more service entity autonomous vehicle backend interfaces 234, etc.) and a vehicle API (e.g., vehicle API 232) to facilitate communication from the service entity infrastructure services (e.g., via the public platform 202, via one or more service provider vehicle backend interfaces 234, etc.) to the vehicles 208*a*, 208*b*. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service entity vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity vehicles (e.g., in a third-party entity vehicle fleet) such as third-party vehicles 214*a*, 214, 216*a*, and 216*b*. The third-party entity platforms 210, 212 can be distinct and remote from the service provide infrastructure and provide for management of vehicles associated with a third-party entity fleet, such as third-party entity (e.g., Vendor X) vehicles 214*a*, 214*b* and third-party entity (e.g., Vendor Y) vehicles 216*a*, 216*b*. The third-party entity (e.g., Vendor X) platform 210 and third-party entity (e.g., Vendor Y) platform 212, and/or third-party entity (e.g., Vendor X) vehicles 214*a*, 214*b* and third-party entity (e.g., Vendor Y) vehicles 216*a*, 216*b* can communicate with the service entity operations computing system 204 (e.g., system clients, operations computing system 104, etc.) via the public platform 202 to allow the third-party entity platforms and/or vehicles to access one or more service entity infrastructure services (e.g., trip services, routing services, payment services, user services, etc.).

The service infrastructure 200 can include a plurality of software development kits (SDKs) (e.g., set of tools and core libraries), such as SDKs 238, 240*a*, 240*b*, 242, 244, 246*a*, 246*b*, 248, 250*a*, and 250*b*, that provide access to the public platform 202 for use by both the service provider autonomous vehicles (208*a*, 208*b*) and the third-party entity vehicles (214*a*, 214*b*, 216*a*, 216*b*). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service entity vehicle fleet (e.g., vehicle 208*a*, 208*b*) and/or test platform 218 can use both the public SDK and the private SDK, whereas the third-party entity autonomous vehicles (vehicle 214*a*, 214*b*, 216*a*, 216*b*) can use only the public SDK and associated endpoints. In some implementations, the SDKs can provide a single entry point into the service entity infrastructure (e.g., public platform 202, etc.), which can improve consistency across both the service provider fleet and the third-party entity fleet(s). As an example, a public SDK can provide secured access to the public platform 202 by both service entity vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service entity vehicles and provide access to capabilities such as remote assistance, vehicle management, operational data access, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK (e.g., public or private) to which to provide access.

Turning back to FIG. 1, the vehicle computing system 112 can include a communications system 136 configured to allow the vehicle computing system 112 (and its one or more computing devices) to communicate with other computing devices (e.g., such as the operations computing system devices of FIG. 2). The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service).

By way of example, the vehicle 102 can be associated with a service provider (as discussed with reference to FIG. 1) configured to provide a vehicle service for one or more users. The service provider can be associated with a plurality of different vehicles (e.g., the vehicle 102) that can be utilized to provide the vehicle service for one or more users of the service provider. For instance, the service provider can include a ride-share service provider configured to provide a ride-sharing service for one or more users of the service as described herein with reference to FIG. 2. In this regard, the service provider can be associated with a plurality of users that can interact (e.g., schedule, request, accept, etc.) with the service provider to obtain a transportation service.

For example, each of the plurality of users can be associated with a respective user device (e.g., a respective remote computing device 106). A user device, for example, can include a smartphone, tablet, hand-held computing device, wearable computing device, embedded computing device, navigational computing device, etc. The user device can include a user software application that runs on the user device and, in some implementations, a request for a transportation service can be generated and communicated to the service provider via the user software application. In addition, or alternatively, each user can be associated with a user account for the service provider. The user account can include information for the respective user such as, for example, one or more locations (e.g., a home address, a work address, etc.), a user rating (e.g., a reliability rating, etc.), a user status (e.g., gold, medallion, etc.), a number of trips taken, etc.

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

By way of example, the communications system 136 can include one or more external communication interfaces configured to communicate with the one or more remote computing devices 106 (e.g., a user device), the operations computing system 104 (e.g., a service provider device), the security database 150, etc. The external communication interfaces can include, for example, one or more wired communication interfaces (e.g., USB, Ethernet, Fire Wire, etc.), one or more wireless communication interfaces (e.g., Zigbee wireless technology, Wi-Fi, Bluetooth, etc.), etc. For example, the communication interfaces can establish communications over one or more wireless communication channels (e.g., via local area networks, wide area networks, the Internet, cellular networks, mesh networks, etc.). The one or more channels can include one or more encrypted and/or unencrypted channels. The channels, for instance, can include gRPC messaging. For instance, in some implementations, the channels can include unencrypted channels, encrypted using one or more cryptographic signing techniques (e.g., symmetric signing, asymmetric signing, etc.).

The vehicle computing system 112 can receive a plurality of messages, via the one or more external communication interfaces, from the one or more devices (e.g., of the operations computing system 104, remote computing devices 106 such as a user device, remote devices associated with the service entity, etc.). Each message of the plurality of messages can include at least one request. A request can include a request to complete a task such as, for example, to receive information, initiate an operation, etc. as specified by the message. For example, as discussed herein with reference to FIGS. 3A-B, the system 100 (e.g., vehicle computing system 112, operations computing system 104, remote computing device 106, security database 150, etc.) can include a plurality of processes running on a plurality of devices (vehicle devices of the vehicle computing system 112, remote device remote from the vehicle computing system 112) of the system 100. The plurality of processes can be collectively configured to perform one or more tasks or services of the system 100, for example, as requested by a message.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 102. For example, the vehicle computing system 112 can send one or more control signals to activate one or more vehicle systems that can be used to control and/or direct the travel path of the vehicle 102 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 102 (e.g., auditory and/or visual messages about the state or predicted state of objects external to the vehicle 102); braking systems; propulsion systems that can be used to change the acceleration and/or velocity of the vehicle which can include one or more vehicle motor or engine systems (e.g., an engine and/or motor used by the vehicle 102 for locomotion); and/or steering systems that can change the path, course, and/or direction of travel of the vehicle 102.

The following describes the technology of this disclosure within the context of an autonomous vehicle for example purposes only. As described herein, the technology of the present disclosure is not limited to an autonomous vehicle and can be implemented within other robotic and/or other computing systems, such as those managing messages from a plurality of disparate processes. As an example, the system 100 of the present disclosure can include any combination of the vehicle computing system 112, one or more subsystems and/or components of the vehicle computing system 112, one or more remote computing systems such as the operations computing system 104, one or more components of the operations computing system 104, and/or other remote computing devices 106. For example, each vehicle sub-system can include one or more vehicle device(s) and each remote computing system/device can include one or more remote devices. The plurality of devices of the system 100 can include one or more of the one or more vehicle device(s) (e.g., internal devices) and/or one or more of the remote device(s).

Figure 3A:
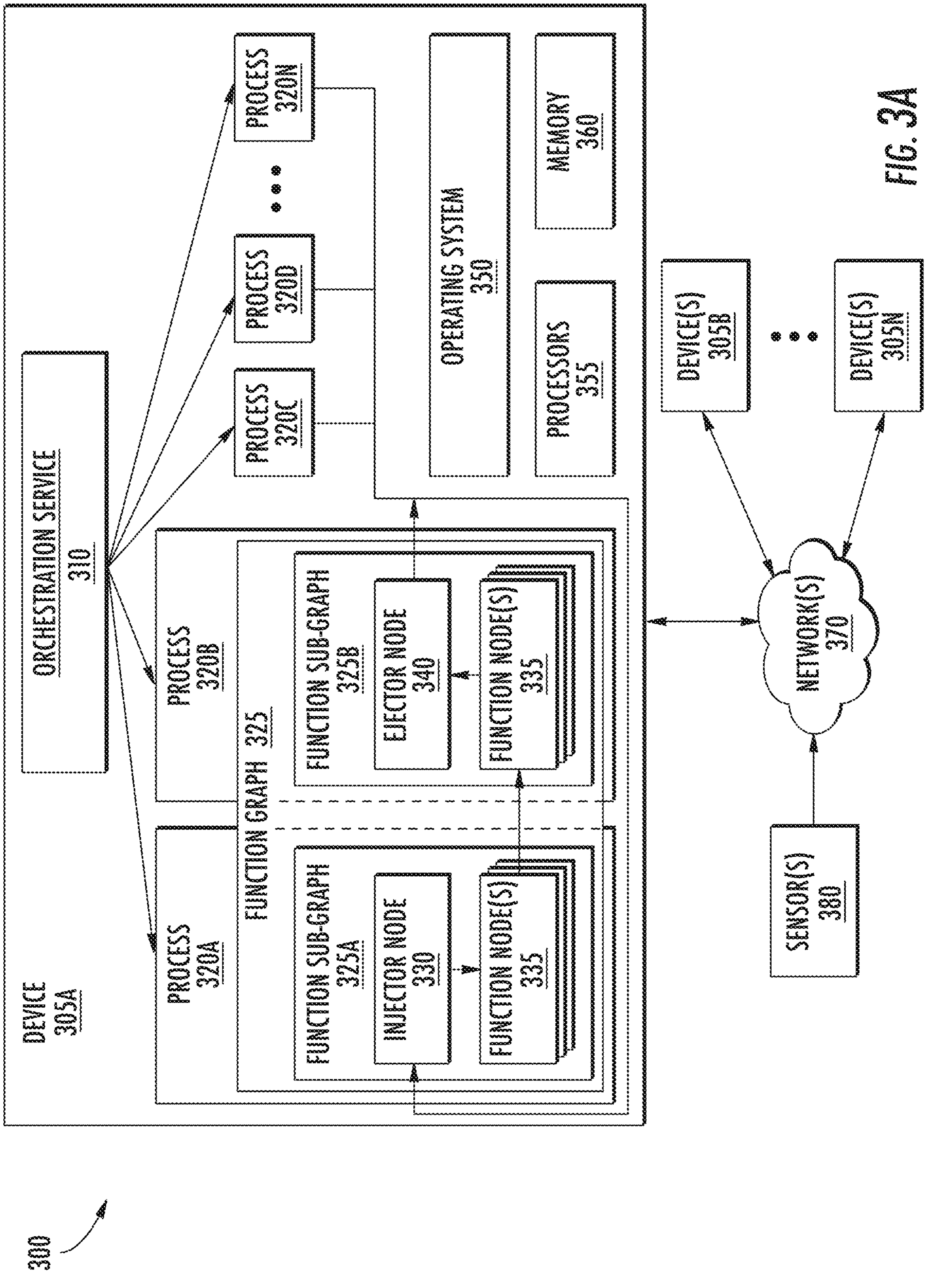
FIG. 3A depicts a diagram of an example system including a plurality of devices configured to execute one or more processes according to example implementations of the present disclosure.

FIG. 3A depicts a diagram of an example computing system 300 including one or more of the plurality of device (e.g., plurality of devices 305A-N) of the computing system of the present disclosure. The plurality of devices 305A-N can include one or more devices configured to communicate over one or more wired and/or wireless communication channels (e.g., wired and/or wireless networks). Each device (e.g., 305A) can be associated with a type, an operating system 350, and/or one or more designated tasks. A type, for example, can include an indication of the one or more designated tasks of a respective device 305A. The one or more designated tasks, for example, can include performing one or more processes 320A-N and/or services of the computing system 300.

Each device 305A of the plurality of devices 305A-N can include and/or have access to one or more processors 355 and/or one or more memories 360 (e.g., RAM memory, ROM memory, cache memory, flash memory, etc.). The one or more memories 360 can include one or more tangible non-transitory computer readable instructions that, when executed by the one or more processors 355, cause the device 305A to perform one or more operations. The operations can include, for example, executing one or more of a plurality of processes of the computing system 300. For instance, each device 305A can include a compute node configured to run one or more processes 320A-N of the plurality of processes.

For example, the device 305A can include an orchestration service 310. The orchestration service 310 can include a start-up process of the device 305A. The orchestration service 310, for example, can include an operating system service (e.g., a service running as part of the operating system 350). In addition, or alternatively, the orchestration service can include a gRPC service. The device 305A can run the orchestration service 310 to configure and start processes 320A-320N of the device 305A. In some implementations, the orchestration service 310 can include a primary orchestrator and/or at least one of a plurality of secondary orchestrators. For example, each respective device of the plurality of device can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 305A-N, a software version and/or environment on which to run a plurality of processes (e.g., 320A-320N of the device 305A) of the computing system 300, etc. A secondary orchestrator for each respective device can receive the global configuration data and configure and start one or more processes at the respective device based on the global configuration data.

For instance, each process (e.g., process 320A, 320B) can include a plurality of function nodes 335 (e.g., pure functions) connected by one or more directed edges that dictate the flow of data between the plurality of function nodes 335. Each device 305A can execute (e.g., via one or more processors, etc.) a respective plurality of function nodes 335 to run a respective process 320A, 320B. For example, the plurality of function nodes 335 can be arranged in one or more function graphs 325. A function graph 325 can include a series of function nodes 335 arranged (e.g., by one or more directed edges) in a pipeline, graph architecture, etc.

Figure 3B:
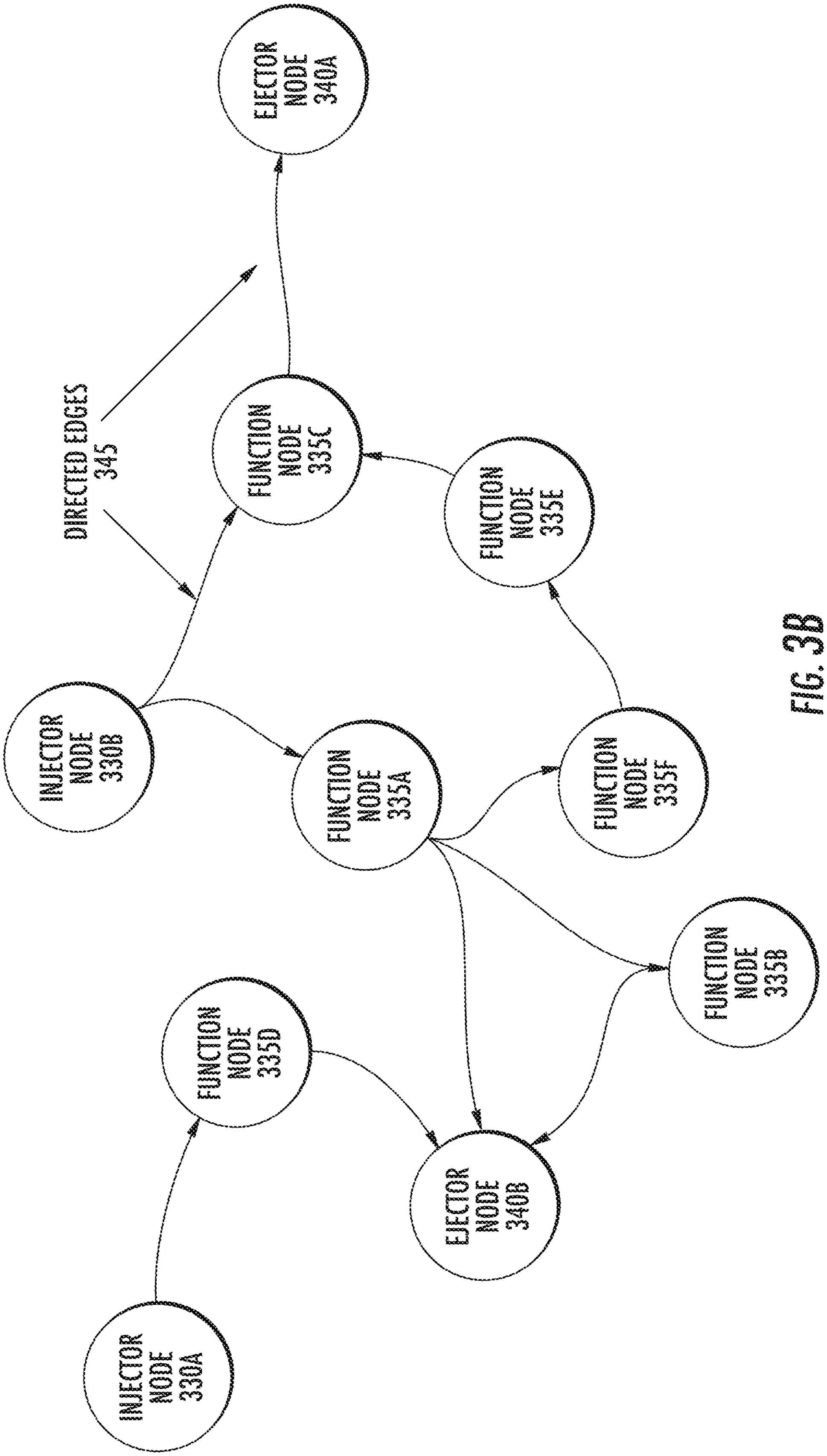
FIG. 3B depicts a diagram of an example functional graph according to example implementations of the present disclosure.

For example, with reference to FIG. 3B, FIG. 3B depicts a diagram of an example functional graph 325 according to example implementations of the present disclosure. The function graph 325 can include a plurality of function nodes 335A-F, one or more injector nodes 330A-B, one or more ejector nodes 340A-B, and/or one or more directed edges 345A-J. The function nodes 335A-F can include one or more computing functions with one or more inputs (e.g., of one or more data types) and one or more outputs (e.g., of one or more data types). For example, the function nodes 335A-F can be implemented such that they define one or more accepted inputs and one or more outputs. In some implementations, each function node 335A-F can be configured to obtain one or more inputs of a single data type, perform one or more functions on the one or more inputs, and output one or more outputs of a single data type.

The function nodes 335A-F can be connected by one or more directed edges 345A-J of the function graph 325 (and/or a subgraph 325A, 325B of the function graph 325 with reference to FIG. 3A). The one or more directed edges 345A-J can dictate how data flows through the function graph 325 (and/or the subgraphs 325A, 325B of FIG. 3A). For example, the one or more directed edges 345A-J can be formed based on the defined inputs and outputs of each of the function nodes 335A-F of the function graph 325. Each function graph 325 can include one or more injector nodes 330A-B and one or more ejector nodes 320A-B configured to communicate with one or more remote devices and/or processes (e.g., processes 320C-320N of FIG. 3A) outside the function graph 325. The injector nodes 330A-B, for example, can be configured to communicate with one or more devices and/or processes (e.g., processes 320C-320N of FIG. 3A) outside the function graph 325 to obtain input data for the function graph 325. By way of example, each of the one or more injector nodes 330A-B can include a function configured to obtain and/or process sensor data from a respective sensor 380 shown in FIG. 3B (e.g., sensor(s) 114 of FIG. 1). The ejector nodes 340A-B can be configured to communicate with one or more devices 305B-N and/or processes 320C-320N outside the function graph 325 to provide output data of the function graph 325 to the one or more devices 305B-N and/or processes 320C-320N.

Turning back to FIG. 3A, each device 305A-N can be configured to execute one or more function graphs 325 to run one or more processes 320A, 320B of the plurality of processes 320A-N of the respective device 305A. For example, as described herein, each respective device can be configured to run a respective set of processes based on global configuration data. Each process 320A-N can include an executed instance of a function graph and/or a subgraph of a function graph. For example, in some implementations, a function graph 325 can be separated across multiple processes 320A, 320B. Each process 320A, 320B can include a subgraph 325A, 325B (e.g., process 320A including subgraph 325A, process 320B including subgraph 325B, etc.) of the function graph 325. In such a case, each process 320A, 320B of the function graph 325 can be communicatively connected by one or more function nodes 335 of the function graph 325. In this manner, each respective device 305A-N can be configured to run a respective process by executing a respective function graph and/or a subgraph of the respective function graph. Thus, each function graph can be implemented as a single process or multiple processes. Although a function graph architecture is described herein with respect to processes, the processes are not limited to such an architecture. For example, the processes running on a user device (e.g., an onboard tablet) may utilize a different software architecture.

In some implementations, one or more of the plurality of processes 320A-N can include containerized services (application containers, etc.). For instance, each process 320A-N can be implemented as a container (e.g., docker containers, etc.). For example, the plurality of processes 320A-N can include one or more containerized processes abstracted away from an operating system 350 associated with each respective device 305A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of processes 320A-N of the computing system 300 (e.g., the plurality of processes of the vehicle computing system 112, a plurality of processes of the one or more remote devices, etc.) can be communicatively connected over one or more wireless and/or wired networks. For instance, the plurality of processes 320A-N can communicate over one or more communication channels using an internal communication interface. Each process can exchange messages over the one or more communicative channels using a message interchange format (e.g., JSON, IDL, etc.). By way of example, each respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. For instance, an originating process running on one or more remote computing devices can be configured to generate a plurality of messages for a recipient process running on the one or more vehicle devices. Each message of the plurality of messages can be associated with the intended recipient process and, for example, can include a request for the intended recipient process.

Figure 4:
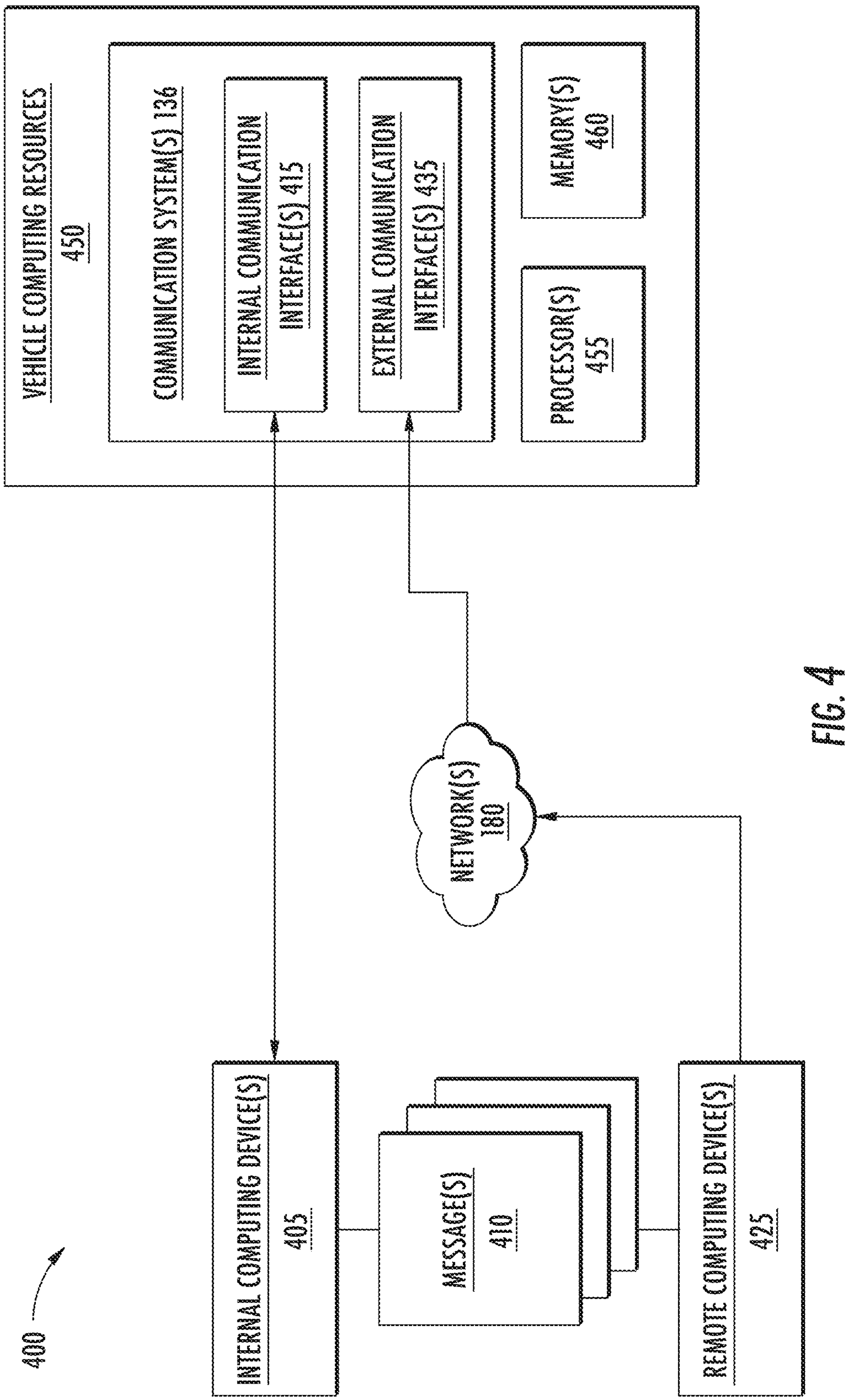
FIG. 4 depicts an example message servicing system according to example implementations of the present disclosure.

For example, FIG. 4 depicts an example message servicing system 400 according to example implementations of the present disclosure. As illustrated, a vehicle computing system can receive a plurality of messages 410 (e.g., via one or more internal communications interfaces 415, external communications interfaces 435, etc. of the communication interface 136) from a plurality of processes running on the one or more devices of the computing system (e.g., internal devices 330A-N, remote devices 106 such as a user device, etc.). For example, the vehicle computing system can receive one or more of the plurality of messages 410 from the one or more internal computing devices 405 (e.g., vehicle computing devices 330A-N) via an internal communication interface 415 of the communication system 136. In addition, or alternatively, the vehicle computing system can receive one or more of the plurality of messages 410 from one or more remote computing devices 425 (e.g., user device(s), operational computing systems, etc.) over network 108 via one or more external communication interface(s) 435.

The vehicle computing system of an autonomous vehicle can include a plurality of vehicle computing resources 450 that facilitate the operation of the vehicle. The vehicle computing resources 450, for example, can include a plurality of hardware resources such as, for example, processors, a common communication infrastructure (e.g., a plurality of communication interfaces including routers, modems, terminals, switches, gateways, etc.), one or more memories, etc. and/or a plurality of software resources such as, for example, one or more applications (e.g., streaming services, pay to play games, etc.), processes, etc. running on and/or accessible to the autonomous vehicle. For example, the vehicle computing resources 450 can include the communication system(s) 136, the internal communication interface(s) 415, the external communication interface(s) 435, processors 455, memory(s) 460, etc.

In some implementations, a computing resource can be devoted to one or more subsystems of the vehicle 102 of FIG. 1 (e.g., vehicle computing system 112, etc.) and/or one or more remote device(s) 106 communicatively connected (e.g., via network 108) to the vehicle 102. In addition, or alternatively, the one or more subsystems of the vehicle 102 (e.g., vehicle computing system 112, etc.) and/or remote devices 106 communicatively connected to the vehicle 102 can be configured to share the plurality of vehicle computing resources 450. In such a case, it may be beneficial to control access to the plurality of computing resources 450 by prioritizing messages received from each subsystem and/or remote device.

Figure 5:
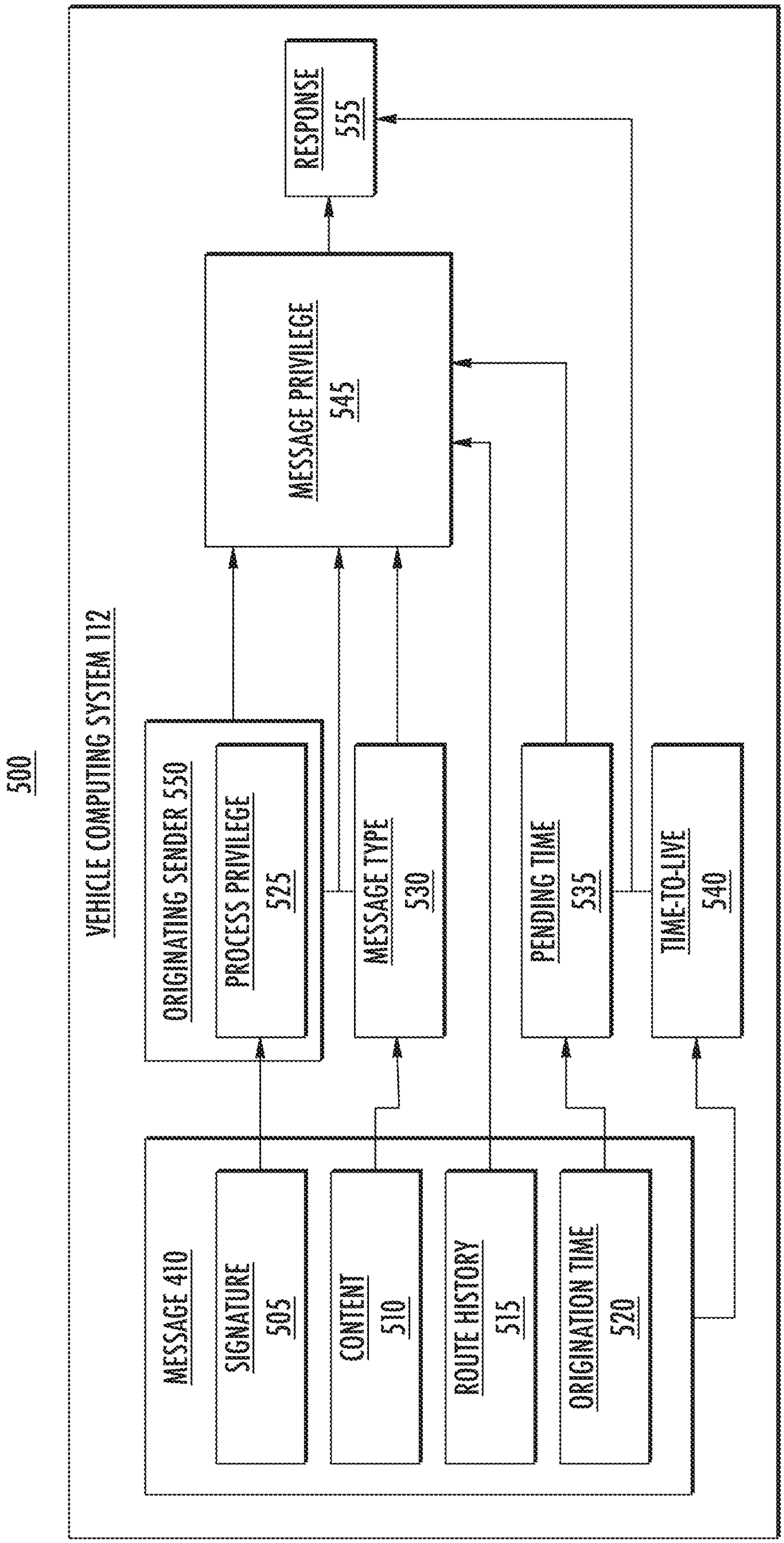
FIG. 5 depicts an example data flow diagram of a message servicing system according to example implementations of the present disclosure.

FIG. 5 depicts an example data flow diagram 500 of a message servicing system according to example implementations of the present disclosure. As depicted, each message of the plurality of messages 410 can include one or more of a signature 505, content 510, a route history 515, an origination time 520, etc. The content 510 can include contextual information, a request for access to one or more computing resources of the vehicle computing system 112, and/or a command indicative of a task for the vehicle computing system 112.

In some implementations, the contextual information can include data indicative of one or more aspects of a surrounding environment of vehicle computing system 112. For example, the contextual information can include an indication of the presence of an object (e.g., static object(s) such as roadways, buildings, signs, etc., dynamic object(s) such as pedestrians, other vehicles, etc., etc.) within the surrounding environment of an autonomous vehicle, a state of the object (e.g., the status of a traffic light (e.g., red, yellow, green), etc.), environmental information (e.g., weather information (e.g., rain, snow, etc.), lighting information (e.g., low light conditions while the vehicle is operating at night, in a tunnel, etc., high light conditions while the vehicle is operating during the day, etc.). In addition, or alternatively, the contextual information can include assignment information indicative of one or more assignments for the vehicle computing system 112 (e.g., the vehicle of the vehicle computing system 112). The assignment information can include ride-share information such as, for example, one or more times for beginning and/or completing a transportation service, one or more users for the transportation service, one or more locations (e.g., a pick-up/drop-off location, etc.) for the transportation service, etc.

The vehicle computing system 112 can obtain a message including the contextual information and reason about the surrounding environment of the autonomous vehicle and/or a vehicle assignment for the autonomous vehicle of the vehicle computing system 112 based on the contextual information. The vehicle computing system 112 can perform one or more vehicle functions based on the surrounding environment reasoning and/or the vehicle assignment reasoning. For example, the vehicle computing system 112 (e.g., a motion planning system, etc.) can generate a motion plan for the autonomous vehicle based on the contextual information (e.g., perform a stop operation at a red light, perform a pick-up operation at a pick-up location, etc.).

The plurality of messages 410 can also include one or more messages containing a request for access to one or more computing resources of the vehicle computing system. The request for access to one or more computing resources can include, for example, a request for access to one or more processors of the autonomous vehicle to perform an operation of the message 410, a request for access to one or more common communication interfaces of the autonomous vehicle to access one or more remote services (e.g., Internet services, etc.), a request for access to one or more memory devices of the autonomous vehicle to store data, etc. By way of example, one or more processes onboard the vehicle and/or remote from the vehicle can request access to one or more communication interfaces (e.g., routers, modems, terminals, etc.) of the vehicle computing system 112 to establish and/or facilitate an Internet connection. The vehicle computing system 112 can obtain the message 410 including such a request and assign one or more communication interfaces of the vehicle computing system 112 to service the request. In this manner, the vehicle computing system 112 can utilize one or more shared communication interfaces onboard the autonomous vehicle to connect one or more vehicle devices and/or remote device(s) (e.g., user devices) to the Internet.

In addition, or alternatively, one or more message(s) of the plurality of messages can include a command. The command can include data indicative of a task for the vehicle computing system 112 (e.g., the autonomous vehicle of the vehicle computing system 112). The command, for example, can include a request to receive vehicle health information (e.g., a health check), a confirmation to continue online operation in response to a vehicle request to continue online operation, a request to initiate one or more safety operations, etc. By way of example, the vehicle computing system 112 can be configured to communicate with one or more remote devices (e.g., of the operations computing system) to ensure one or more systems onboard the vehicle are functioning properly. In some implementations, the vehicle computing system 112 can be configured to receive continuous, periodic, scheduled, etc. messages from the one or more remote devices including commands to continue operation and/or to initiate one or more safety routines.

The vehicle computing system 112 can determine any number of responses 555 to each of the plurality of messages 410 depending on the content 510 of the message 410 (e.g., contextual information, request, command, etc.) and/or one or more aspects of the message 410. For example, the vehicle computing system 112 can determine a response 555 to each of the plurality of messages 410 based on a message privilege 545 associated with the message 410. The message privilege 545, for example, can be based on an originating sender 550, message type 530, routing history annotation 515, priority, timing (e.g., origination time 520, pending time 535, time-to-live 540), user privilege (e.g., as indicated by a process privilege 525), etc. associated with the message 410.

For example, the vehicle computing system 112 can determine a message privilege 545 for a message based on an originating sender 550 of the message. The originating sender 550, for example, can be indicative of a process that generated the message. For instance, the originating sender 550 can include an internal and/or remote process of the vehicle computing system 112. Each process can be associated with a process-specific identity. The process can generate a message 410 for the vehicle computing system 112 and sign the message with the process-specific identity. In this manner, the vehicle computing system 112 can determine the originating sender 550 based on a signature 505 of the message 410. The vehicle computing system 112 can determine the message privilege 545 for the message based on the originating sender 550.

In some implementations, the vehicle computing system 112 can determine the originating sender 550 based, at least in part, on a cryptographic signature associated with the message 410. For example, the message 410 can include a cryptographic signature 505. The cryptographic signature 505, for example, can include the process-specific identity (e.g., an identity associated with the related/originating process) encrypted by one or more cryptographic keys. The process-specific identity can include, for example, a process identifier unique to the process. For instance, the cryptographic signature 505 can be previously generated for the message 410 by the originating sender 550 using one or more cryptographic signing schemes. In such a case, the vehicle computing system 112 can identify the originating sender 550 by decrypting the encrypted signature (e.g., using a corresponding cryptographic signing scheme).

Figure 6:
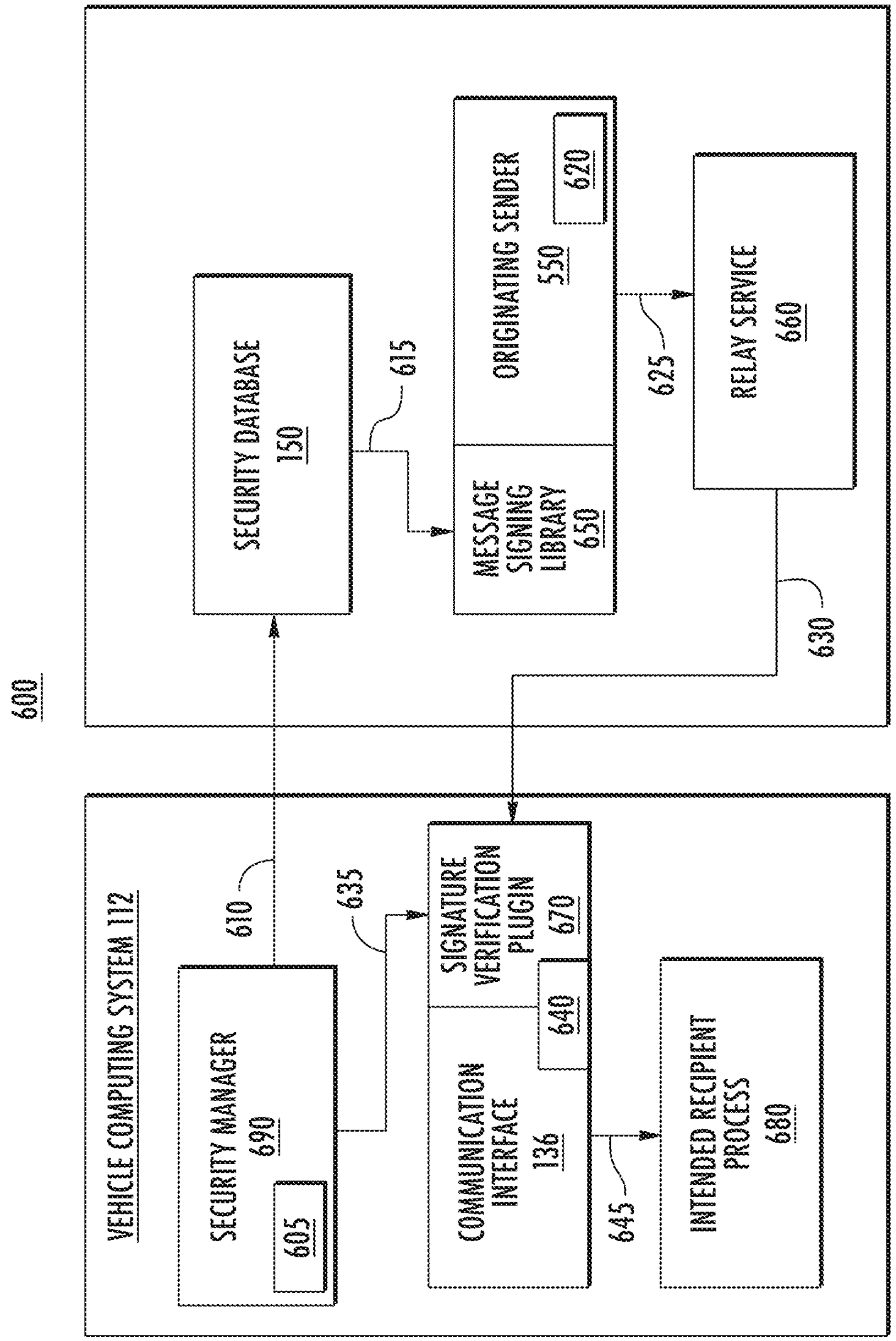
FIG. 6 depicts an example cryptographic message signing process according to example implementations of the present disclosure.

As an example, FIG. 6 depicts an example cryptographic message signing process 660 according to example implementations of the present disclosure. The vehicle computing system 112 (e.g., a signature verification plugin 670 of the vehicle computing system 112) can decrypt the encrypted signature by obtaining a cryptographic key, at 635, associated with the message and/or the originating sender 550 of the message. In addition, or alternatively, the signature verification plugin 670 can determine a validity of the message, at 640, based on the cryptographic signature and the cryptographic key. For example, the signature verification plugin 670 can attempt to decrypt (e.g., reconfigure) the signature using the cryptographic key. The signature verification plugin 670 can determine that the cryptographic signature is valid in the event that the decrypted signature identifies an internal and/or remote process. In addition, or alternatively, the signature verification plugin 670 can determine that the cryptographic signature is invalid in the event that the decrypted signature fails to identify an internal and/or remote process known to the vehicle computing system 112.

By way of example, the cryptographic signature can be generated by the originating sender 550 based on a symmetric signing scheme. For instance, the signature can be previously generated for the message by the originating sender 550 based on the one or more shared secrets. For example, the one or more shared secrets can include one or more symmetric private keys (e.g., a 256 bit AES key) known by the vehicle computing system 112 and the originating sender 550.

For example, a security manager 690 of the vehicle computing system 112 can be configured to generate, at 605, at least one private key for one or more internal and/or remote devices and/or remote processes running on the one or more internal and/or remote devices. The private keys can be stored at the security manager 690 and provided, at 610, to a backend security database 150. The backend security database 150, for example, can include one or more memories, servers and/or secret management processes communicatively connected to the vehicle computing system 112 and one or more remote devices (e.g., a user device, an operational computing system device, etc.). The security database 150 can receive authorization credentials from a message signing library 650 of the originating sender 550 and, in response, provide, at 615, at least one symmetric private key to the message signing library 650 of the originating sender 550. The message signing library 650 can store the authorization credentials (e.g., in one or more short term memories accessible by the originating sender 550) for use by the originating sender 550.

The originating sender 550 (e.g., via the message signing library 750) can sign, at 620, the message with a process specific identifier. The process specific identifier can be encrypted by the symmetric private key to generate a cryptographic signature. The signed message can be provided, at 630, to the signature verification plugin 670. For example, in some implementations, an internal and/or remote device can include a relay service 660 (e.g., VIP Relay 660) configured to provide, at 630, the signed message to the signature verification plugin 670 of the vehicle computing system 112. The originating sender 550 can provide, at 625, the signed message to the relay service 660 and the relay service 660 can forward, at 630, the signed message to the signature verification plugin 670. The signature verification plugin 670 can identify the cryptographic signature and, in response, receive a corresponding symmetric private key, at 635, stored at the security manager 690. The signature verification plugin 670 can decrypt, at 640, the cryptographic signature of the message with the corresponding symmetric private key. The signature verification plugin 670 can verify the signature associated with the message based, at least in part, on the decrypted signature.

As another example, the cryptographic signature can be generated by the originating sender 550 based on an asymmetric signing scheme. For example, the security database 150 can be configured to generate a root certificate and private key corresponding to the root certificate. The root certificate can include a publicly accessible key corresponding to the private key such that a signature encrypted by the private key can be decrypted by the public key, and/or vice versa. The security database 150 can utilize the root certificate and/or private key to sign an intermediate certificate associated with one or more intermediate signing services running at the security database 150 and/or on one or more remote devices. The intermediate signing services can utilize the intermediate certificate to sign operational certificates for one or more processes (e.g., originating sender 550) running at the security database 150 and/or remote devices. In this manner, a certificate authority chain can be created in which one or more processes running at the security database 150 and/or remote devices are authorized by an intermediate certificate that derives authority from the root certificate.

More particularly, the security database 150 (and/or a security service running at the security database 150) can generate a root certificate and root private key corresponding to the root certificate. The security database 150 can provide the root certificate to the vehicle computing system 112. The vehicle computing system 112 can store the root certificate in one or memories of the vehicle computing system 112 (e.g., at the security manager 690). The security database 150 can provide asymmetric keys (e.g., intermediate certificates signed using the root certificate and corresponding private keys) to one or more internal and/or remote signing services (e.g., message signing library 650) for each of the one or more internal and/or remote devices. For instance, each remote signing service that is authorized (e.g., preauthorized, associated with authorized user credentials, etc.) to communicate with the vehicle computing system 112 can include a security database token. The signing service can use the security database token to request an intermediate certificate and corresponding private key from the security database 150 (e.g., at startup of the vehicle, at every 24 hour interval, etc.). The security database 150 can validate the security database token (e.g., via an LDAP, stored credentials, etc.) and provide the intermediate certificate and corresponding private key to the remote signing service in response to the validation.

The signing services can generate operational certificates for a remote process running on a remote device, an internal process running on the vehicle computing system 112, etc. sign the operational certificate, and encrypt the signature with the private key corresponding to the intermediate certificate. The originating sender 550 can generate a message including the signed operational certificate and send the message to the vehicle computing system 112. The vehicle computing system 112 (e.g., signature verification plugin 670) can receive the message and identify the signing service that signed the operational certificate of the message. The vehicle computing system 112 (e.g., signature verification plugin 670) can obtain the intermediate certificate (e.g., including the public key corresponding to the private key) of the remote signing service and decrypt the cryptographic signature of the operational certificate using the public key of the intermediate certificate. The signature verification plugin 670 can verify the signature associated with the message based on the decrypted signature.

Turning back to FIG. 5, the vehicle computing system 112 can determine the message privilege 545 for the message 410 based on the identified originating sender 550. For example, in some implementations, each respective process of the plurality of processes running on the one or more internal or remote devices can be associated with one or more process message privileges 525. The one or more process message privileges 525 can be indicative of a reliability of the process, a trustworthiness of the process, a length of operation of the process, etc. For example, a process running onboard the autonomous vehicle (e.g., vehicle computing system 112) can be associated with an error rate indicative of the accuracy of the contextual information generated by the process (e.g., originating sender 550). In some implementations, the error rate can be improved based on the length of operation of the process (e.g., the process can utilize machine learned models that improve over time, etc.) such that the process message privilege 525 of the process can increase over time. Moreover, in some implementations, one or more processes can be inherently reliable (e.g., remote override processes overseen by remote vehicle operators), whereas other processes can be inherently unreliable (e.g., processes undergoing validation testing, etc.). In such a case, the process message privilege 525 for the process (e.g., originating sender 550) can be based on the inherent reliability of the process.

The vehicle computing system 112 can determine the message privilege 545 for the message 410 based on the one or more process message privileges 525 associated with the originating sender 550. For example, the vehicle computing system 112 can determine a higher message privilege for a message associated with an originating sender 550 that is inherently reliable such as, for example, a remote override process relative, than a message associated with an originating sender 550 that may be considered less reliable such as, for example, unvalidated processes. In this manner, the message privilege 545 for the message 410 can be determined based on the reliability of the process that generated the message 410.

In addition, or alternatively, the vehicle computing system 112 can determine the message privilege 545 for the message 410 based on a message type 530 of the message 410. For example, the vehicle computing system 112 can determine a message type 530 for the message based on the content of the message. By way of example, the message type 530 can include a respective message type 530 of a plurality of predefined message types. The plurality of message types can be indicative of a type of contextual information of the message 410, a type of request of the message 410, the type of command of the message 410, etc. For example, a message including contextual information indicative of an object within the surrounding environment of the vehicle can be assigned a perception message type, a message including contextual information indicative of a future location of the object can be assigned a prediction message type, a message including contextual information indicative of a hazardous condition can be assigned a safety message type, a message including a request for access to computing resources of the vehicle can be assigned a request message type, etc.

The vehicle computing system 112 can determine a message privilege 545 for the message 410 based on the message type 530. For example, the vehicle computing system 112 can determine a higher message privilege for messages assigned a safety message type relative to other message types. By way of example, a message including contextual information identifying a hazardous condition (e.g., ice on the roadway, a pedestrian jay-walking, etc.) can be assigned a higher message privilege than a message including a request for access to computing resources (e.g., for Internet connectivity, etc.). In this manner, the vehicle computing system 112 can encourage vehicle safety by prioritizing the processing of safety messages over less immediately critical messages.

In some implementations, the vehicle computing system 112 can determine the message privilege 545 for the message 410 based on a comparison of the message type 530 and the originating sender 550. For example, the one or more process message privileges 525 associated with an originating sender 550 can include a respective message privilege for one or more message types 530. By way of example, in a testing environment, a perception process can have a high process message privilege for perception type messages (e.g., contextual information indicative of an irregular object within the surrounding environment of the autonomous vehicle that the vehicle may have requested clarification due to lower confidence levels, etc.) and/or a low process message privilege for vehicle action type messages because these types of message may not be what is expected from the perception process (e.g., contextual information indicative of a recommended vehicle action, etc.). In this way, the vehicle computing system 112 can prioritize messages based on the reliability of the originating sender 550 with respect to the message type 530. For example, a perception process can historically provide less reliable vehicle action data than a vehicle action process, and/or vice versa.

In addition, or alternatively, the vehicle computing system 112 can determine message privilege 545 for the message 410 based on a route history 515 of the message 410. For example, a message 410 can include a route history 515 indicative of one or more intermediary processes of the plurality of processes. The one or more intermediary processes can include processes that have received the message 410 before an intended recipient process running on the vehicle computing system 112. For example, a message can be generated by the originating sender 550 and provided to an intended recipient process. Before reaching the intended recipient process, the message can be routed through one or more intermediary processes. By way of example, a perception process can generate a message intended for a motion planning process, the message can be received by one or more intermediary processes (e.g., other perception processes, communication processes, etc.) en route to the motion planning process, and rerouted to the motion planning process by the one or more intermediary processes. In some implementations, the one or more intermediary processes can be configured to annotate the message 420 with a process-specific identity of the intermediary process before rerouting the message 410 to the intended process.

In such a case, the message privilege 545 for the message 410 can be determined based on the route history 515 and/or the one or more intermediary processes of the route history 515. By way of example, one or more aspects (e.g., length, number of intermediary processes, etc.) of the route history 515 can decrease the reliability of the message 410. The vehicle computing system 112 can determine the message privilege 545 for the message 410 based on the length and/or number of intermediary processes identified by the route history 515. For example, a message associated with a long route history can be assigned a lower privilege than another message associated with a short route history.

In addition, or alternatively, the vehicle computing system 112 can determine the message privilege 545 for the message 410 based on the identity of one or more intermediary processes of the route history 515 associated with the message 410. For example, one or more intermediary processes of the route history 515 can be associated with an insecure communication channel and/or can have a history of corrupting messages. A message associated with a route history with one or more insecure intermediary processes can be assigned a lower privilege than messages with a route history without one or more insecure intermediary processes. In this manner, the vehicle computing system 112 can determine a message privilege 545 for the message 410 based on the integrity of the communication channels with which the message 410 reached the vehicle computing system 112.

In addition, in some implementations, the vehicle computing system 112 can determine the message privilege 545 based on one or more times associated with the message 410. For instance, the vehicle computing system 112 can determine an origination time 520 associated with the message 410. The origination time 520, for example, can be indicative of a time in which the message 410 was generated by the originating sender 550. In some implementations, the message 410 can include the origination time 520. For instance, the message 410 can include a time stamp indicative of the time in which it was generated. By way of example, in some implementations, the originating sender 550 can be configured to generate the message 410 and a time stamp to establish a time of generation of the message 410. The originating sender 550 can include the time stamp with the message 410.

In some implementations, the vehicle computing system 112 can determine the message privilege 545 for the message 410 based on a comparison of the origination time 520 and a current time. For example, the vehicle computing system 112 can obtain a current time indicative of a time in which the message 410 is obtained. By way of example, the vehicle computing system 112 can include one or more timing devices (e.g., internal clock, timer, etc.) configured to maintain a current time onboard the vehicle. The vehicle computing system 112 can receive the message 410, obtain the current time from the one or more timing devices, and associate the message 410 with the current time.

The vehicle computing system 112 can determine a message privilege 545 for the message 410 based on a pending time 535 after the origination time 520. For example, the vehicle computing system 112 can determine a pending time period 535 for the message 410 based on a comparison of the origination time 520 and the current time. The pending time period 535, for example, can be indicative of a time period after the origination time 520. In some implementations, the reliability of a message can decrease over time. For example, a message can include contextual information indicative of an object within the surrounding environment of the vehicle at a particular time. The likelihood that the object is still within the surrounding environment of the vehicle can decrease as time passes the particular time. For example, the object and/or the autonomous vehicle can move over time decreasing the likelihood that the object remains within the surrounding environment of the autonomous vehicle. The vehicle computing system 112 can determine the message privilege 545 for the message 410 such that the message privilege 545 can decrease as the pending time period 535 increases.

In addition, or alternatively, the message 410 can be associated with a reliability time threshold indicative of a period of time after the origination time 520 for which the contextual information of the message 410 is reliable. The reliability time threshold can be included in the message 410. In addition, or alternatively, the vehicle computing system 112 can determine the reliability time threshold based, at least in part, on one or more aspects of the message 410 (e.g., originating sender 550, contextual information, etc.). For example, a longer reliability time threshold can be determined for prediction data indicative of the presence of an object at a future time than for perception data indicative of the presence of the object at the current time.

The vehicle computing system 112 can determine a message privilege 545 for the message 410 based on the reliability time threshold. For example, the vehicle computing system 112 can determine the message privilege 545 based on a comparison of the pending time 535 and the reliability time. For instance, the vehicle computing system 112 can determine a higher message privilege for a message associated with a pending time less than a reliability time threshold relative to a message associated with a pending time over a reliability time threshold. In this manner, the vehicle computing system 112 can assign a higher privilege to messages from a less reliable source but received within a reliable time period than messages from a reliable source received after a reliable time period. By way of example, the vehicle computing system 112 can receive a message from a reliable remote override process including contextual information indicating that a traffic light was red five seconds ago. At the same time, the vehicle computing system 112 can receive a message from a perception process indicating that the traffic light is currently green. In such a case, the vehicle computing system 112 can assign a higher message privilege to the message from the perception process even in the event that the perception process is less reliable than the remote override process because the perception process's message was received within a reliability time threshold and the remote override process's message was not.

In some implementations, the originating sender 550 can include a process running on one or more user computing devices. The one or more user computing devices can include, for example, one or more computing devices associated with at least one user of the service provider associated with the autonomous vehicle (e.g., as discussed herein with reference to FIGS. 1 and 2). In such a case, the vehicle computing system 112 can determine a message privilege 545 for the message 410 based on a user privilege associated with the one or more user computing devices. For example, each of the one or more user computing devices can be associated with one or more user privileges. By way of example, a user privilege for a user computing device can be based on a user account associated with the user of the user computing device, a transportation service purchased by the user, etc.

As an example, a user can be associated with a user account indicative of one or more characteristics of the user. In some implementations, the vehicle computing system 112 can determine one or more user privileges for the user based on the one or more characteristics of the user (e.g., as indicated by the user account). For instance, a user account with a long history with the service provider (e.g., based on a number of trips, an age of the account, etc.) can be associated with a higher privilege than a user account with a short history with the service provider. In addition, or alternatively, a user account with a high user rating (e.g., based on the user's behavior during previous services provided to the user, etc.) can be associated with a higher privilege relative to a user account associated with a low user rating. In this manner, a user's privilege can depend on a user's loyalty to the service provider, behavior during services provided by service provider, etc.

The vehicle computing system 112 can determine the message privilege 545 for a message from a process running on a user device based on the user privileges associated with the user of the user device. For instance, the message privilege 545 can mirror the user privileges associated with the user. In this manner, a message received from a user device associated with a high user privilege can be serviced before a message received from a user device associated with a lower user privilege.

In addition, or alternatively, the one or more user privileges can be determined by the vehicle computing system 112 based on a current transportation service for the user. For example, the message 410 can be received by the vehicle computing system 112 from an originating sender 550 running on a user device during a transportation service for the user of the user device. In such a case, the vehicle computing system 112 can determine a user privilege for the user based on one or more characteristics of the current transportation service. The one or more characteristics can include, for example, a purchase price, a service package, a user status, one or more additional charges, etc. By way of example, the vehicle computing system 112 can determine a privilege for a message received from a user device based on a service purchased by the user of the user device. In this manner, a user can pay an additional charge to receive a higher privilege during the vehicle service.

The vehicle computing system 112 can determine a response 555 to the message 410 based on one or more aspects of the message 410. The response can be determined based on, for example, the content 510 of the message, the message privilege 545 assigned to the message, and/or a time-to-live time period 540 associated with the message 410. For example, the vehicle computing system 112 can determine a different response for a message based on the content 510 of the message 410. By way of example, the vehicle computing system 112 can determine a first response for contextual information of a message, a second response for a request of the message, and/or a third response for a command of the message.

Figure 7:
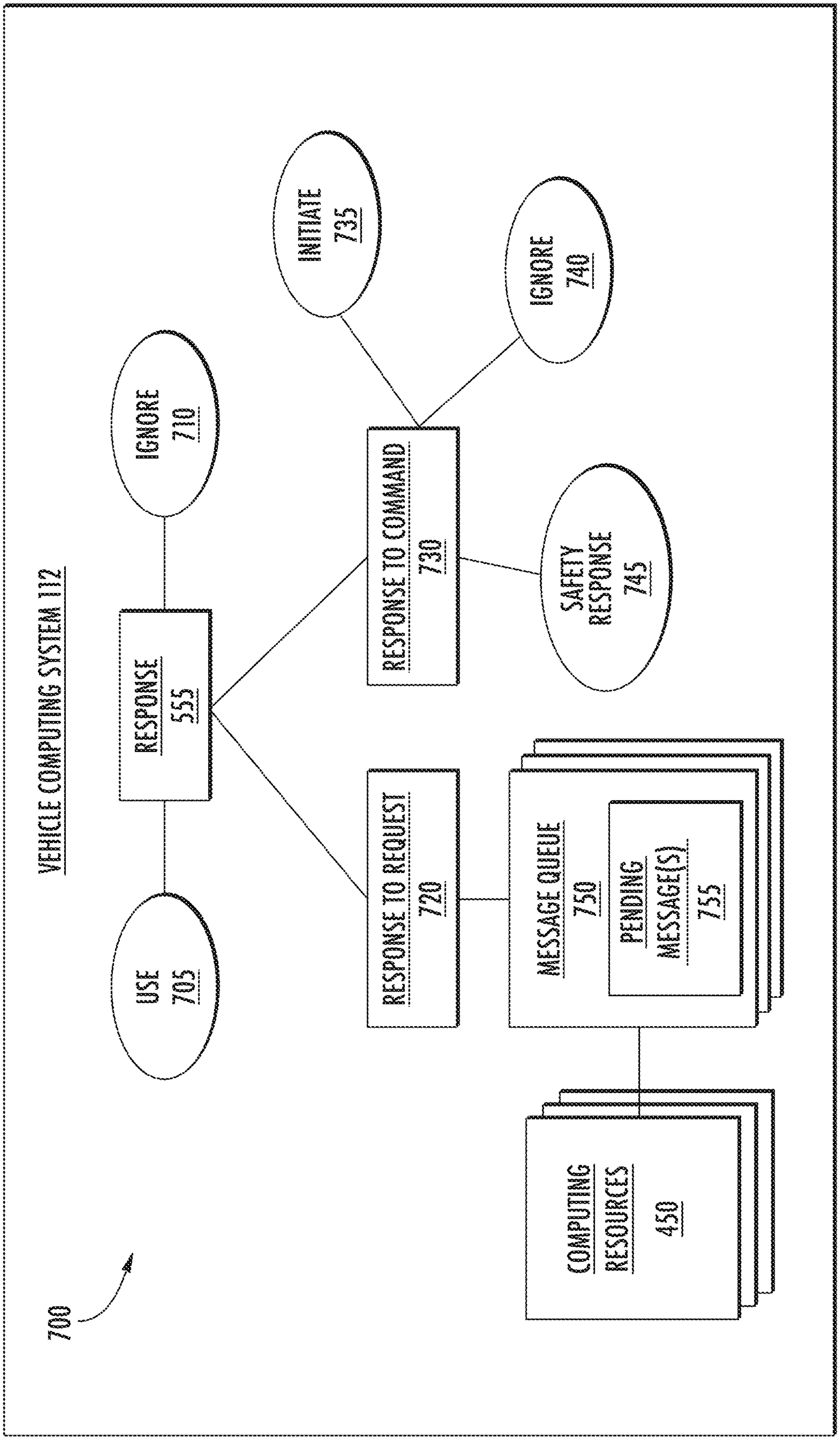
FIG. 7 depicts example message responses based on one or more aspects of the message according to example implementations of the present disclosure.

FIG. 7 depicts example message responses 700 based on one or more aspects of the message 410 according to example implementations of the present disclosure. For example, the vehicle computing system 112 can determine a response 555 for contextual information of a message based on the message privilege 545. The response can be indicative an acceptance (e.g., a decision to use 705) or a rejection (e.g., decision to ignore 710) of the contextual information. By way of example, a response 555 indicative of an acceptance 705 of the contextual information can utilize the contextual information in one or more vehicle reasoning processes, whereas a response indicative of a rejection 710 of the contextual information can ignore the contextual information during one or more vehicle reasoning processes. For example, a first message can include contextual information that contradicts contextual information provided by a second message. The vehicle computing system 112 can determine a first message privilege for the first message and a second message privilege for the second message, in the manner described above, and determine a response 555 to the conflicting contextual information based on the respective message privilege for each message. For example, the vehicle computing system 112 can compare the first message privilege to the second message privilege, accept 705 the contextual information provided by the message associated with the higher privilege, and ignore 710 the contextual information provided by the message associated with the lower privilege.

In some implementations, the response 555 can be determined based on a contextual privilege threshold. For example, the vehicle computing system 112 can be configured to ignore 710 the contextual information of any message associated with a message privilege below the contextual privilege threshold. The vehicle computing system 112 can determine the contextual privilege threshold based on the reasoning process for which the contextual information can be used. By way of example, the vehicle computing system 112 can determine a higher contextual privilege threshold for contextual information used in one or more safety critical decisions (e.g., determining a safety stop, generating a motion plan, etc.), whereas a lower contextual privilege threshold can be determined for non-safety critical decisions (e.g., logging metrics data, etc.).

The vehicle computing system 112 can perform a vehicle action based on the response 555 to the contextual information. For example, the vehicle computing system 112 can determine whether to utilize 705 the contextual information in one or more reasoning processes for the surrounding environment of the autonomous vehicle. By way of example, the vehicle computing system 112 can identify and/or determine the presence and/or state of one or more objects within the surrounding environment of the autonomous vehicle based on the response 555 to the contextual information. As an example, in some implementations, the vehicle computing system 112 can determine one or more vehicle actions (e.g., in accordance with a motion plan, avoidance maneuver, safety maneuver, etc.) based on the response 555 to the contextual information.

The vehicle computing system 112 can determine another response 720 to a request for access to computing resources 450 included in a message based on the message privilege. For example, the response 720 can be indicative of an acceptance of the request or a rejection of the request to grant access to one or more computing resources 450 of the vehicle computing system 112. The vehicle computing system 112 can grant access to the one or more computing resources 450 of the vehicle computing system 112 (e.g., of the autonomous vehicle) in the event that the response 720 is indicative of an acceptance and refuse to grant access to the one or more computing resources 450 of the vehicle computing system 112 (e.g., of the autonomous vehicle) in the event that the response 720 is indicative of a rejection. The vehicle computing system 112 can determine the response 720 based on a request privilege threshold. By way of example, the vehicle computing system 112 can provide access to at least one of the one or more computing resources 450 of the vehicle computing system 112 (e.g., of the autonomous vehicle) in the event that the message is associated with a message privilege above the response threshold. In the event that the request for access to computing resources 450 requests a disabled computing resource, the vehicle computing system 112 can ignore the request, deny the request, and/or respond with a disabled message indicating that the computing resource is disabled.

In some implementations, the vehicle computing system 112 can determine whether one or more of the computing resources 450 are enabled. For example, each of one or more computing resources 450 can be associated with resource state. The resource state can be indicative of whether the computing resource is enabled (e.g., usable by the autonomous vehicle), available, occupied, or disabled (e.g., unusable by the autonomous vehicle). By way of example, one or more disabled computing resources (e.g., sensors, trial applications, etc.) can be disabled during testing of the autonomous vehicle and/or the one or more computing resources. The vehicle computing system 112 can determine that at least one of the one or more computing resources 450 of the autonomous vehicle is enabled before providing access to the at least one computing resource.

In some implementations, the vehicle computing system 112 can provide access to at least one of the one or more computing resources 450 of the vehicle computing system 112 (e.g., of the autonomous vehicle) based on the acceptance, the message privilege, and/or whether the at least one computing resource is enabled. For example, the vehicle computing system 112 can facilitate one or more message queues 750. Each of the one or more message queues 750 can include an ordered list of pending messages 755 based on the message privilege of each of the pending messages 755. In the event that the vehicle computing system 112 accepts the message, the vehicle computing system 112 can supplement at least one of the one or more message queues 750 with the message based on the message privilege.

For example, in some implementations, each of the one or more message queues 750 can be associated with at least one communication interface (e.g., a modem, router, terminal, etc.) of one or more communication interfaces of a common communication infrastructure onboard the autonomous vehicle (e.g., the vehicle computing system 112). Each message queue, for example, can be associated with a respective communication interface onboard the autonomous vehicle. The message queue (e.g., 750) can include an ordered list of pending messages (e.g., 755) to be serviced by the respective communication interface.

The vehicle computing system 112 can add a message to a respective message queue based on the message privilege 545. By way of example, each message queue can be associated with a privilege threshold, such that only messages associated with a message privilege over the privilege threshold are added to the respective message queue. In some implementations, each message queue can be associated with a communication interface based on the privilege threshold. For example, a message queue with a high privilege threshold can be associated with one or more higher end communication interfaces (e.g., that offer faster connection speeds due to more bandwidth, etc.). In this manner, computing resources 450 of a shared communications infrastructure can be allocated to messages based on a privilege associated with the message.

The vehicle computing system 112 can determine another response 730 to a command included in a message. The response 730 can be determined, for example, based on one or more factors such as, for example, the pending time period, a time-to-live interval, and the command. The response can include ignoring 740 the command, initiating 735 the command, and/or initiating one or more safety routines (e.g., safety responses 745).

By way of example, turning back to FIG. 5, the vehicle computing system 112 can determine a time-to-live interval

540 for the message 410. The time-to-live interval 540 can be indicative of a time period after an origination time 520 for the message 410 during which the message 410 is valid. In some implementations, the message 410 can include an indication of the time-to-live interval 540.

In addition, or alternatively, the vehicle computing system 112 can determine the time-to-live interval 540 for the message 410 based one or more factors associated with the message privilege 545. For example, the time-to-live interval 540 can be determined based on the task requested by the command (e.g., a command type). By way of example, the time-to-live interval 540 can include a time period based on a time sensitivity of the requested task. For example, the vehicle computing system 112 can determine a short time-to-live interval for a command to change the autonomy mode of the vehicle that is based on one or more current environmental factors of the vehicle. The time-to-live interval can be short, for example, to prevent the autonomous vehicle from initiating a state change if one or more environmental factors change before the vehicle computing system 112 receives the message 410. In addition, the vehicle computing system 112 can determine a short time-to-live interval for a command in response to a safety signal provided by the vehicle. Here, the time-to-live interval can be short to identify one or more communication problems between the vehicle computing system 112 and the originating sender 550 of the message 410.

The vehicle computing system 112 can determine the time-to-live interval 540 for the message 410 based on the originating sender 550 of the message 410. For example, the vehicle computing system 112 can determine a shorter time-to-live interval for messages generated by an internal process running on one or more vehicle computing devices than for messages generated by a remote process running on one or more remote computing devices, for example, to offset time lost during transmission of remote messages.

In some implementations, the vehicle computing system 112 can adjust the time-to-live interval 540 for the message 410 based on environmental data. For example, the vehicle computing system 112 can obtain environmental data indicative of a surrounding environment of the autonomous vehicle. The environmental data, for example, can include at least one of map data indicative of the surrounding environment of the vehicle, current location data indicative of the location of the autonomous vehicle within the map data, signal quality data indicative of a signal quality associated with the message 410 and/or the current location of the vehicle, weather data indicative of the weather at the current time, etc. The vehicle computing system 112 can modify the time-to-live interval 540 for the message 410 to offset any time lost due to environmental factors. By way of example, the vehicle computing system 112 can adjust the time-to-live interval 540 for a message sent to the vehicle when the vehicle is stuck in traffic in a tunnel where signal loss is expected. The vehicle computing system 112 can predict the time lost in traffic based on map data, traffic data, and/or the current location of the vehicle, and adjust the time-to-live interval 540 based on the expected time lost.

The vehicle computing system 112 can determine a pending time period 535 for the message 410 based on a comparison between the origination time 520 and the current time and determine the response 555 to the command based, at least in part, on the pending time period 535. For example, the vehicle computing system 112 can compare the pending time period 535 to the time-to-live interval 540 to determine the response 555 for the command.

By way of example, in the event that the pending time period 535 is less than the time-to-live interval 540, the vehicle computing system 112 can initiate (e.g., at 735 of FIG. 7) the command. In the event that the pending time period 535 is longer than the time-to-live interval 540, the vehicle computing system 112 can ignore (e.g., at 740 of FIG. 7) the command and/or initiate one or more safety routines (e.g., at 745 of FIG. 7). The one or more safety routines (e.g., at 745 of FIG. 7) can include one or more vehicle actions to make itself safe such as, for example, an emergency stop and/or park, a manual override, an initiation of one or more warning lights, etc. The vehicle computing system 112 can initiate the one or more safety routines based on the task associated with the command. By way of example, the vehicle computing system 112 can initiate one or more safety routines in the event that the command is associated with a safety critical message. A command can be associated with a safety critical message, for example, in the event that the command is indicative of a response to a safety check, a confirmation to continue online operation, etc.

The vehicle computing system 112 can store historical message data of the message 410 in one or more memories associated with the vehicle computing system 112. The historical data for example, can include at least one of the route history 515 of the message 410, the content 510 of the message 410, the cryptographic signature 505 of the message 410, the response 555 determined for the message 410, the message priority 545, etc. In some implementations, the vehicle computing system 112 can analyze the historical data to improve one or more prioritizing functions described herein (e.g., through one or more machine-learning techniques, etc.).

Figure 8:
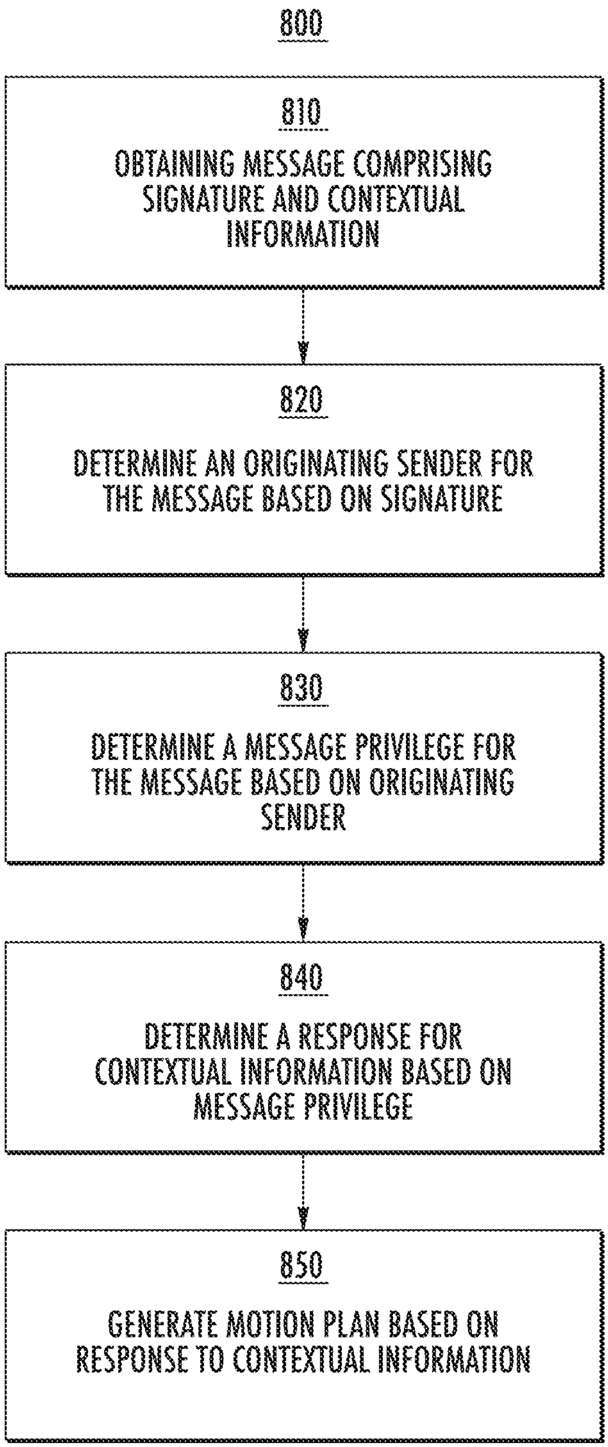
FIG. 8 depict a flowchart diagram of an example method for servicing messages including contextual information according to example implementations of the present disclosure.

FIG. 8 depict a flowchart diagram of an example method for servicing messages including contextual information according to example implementations of the present disclosure. One or more portion(s) of the method 800 can be implemented by a computing system that includes one or more computing devices such as, for example, the computing systems described with reference to the other figures (e.g., the vehicle computing system 112, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-4, 12, 13, etc.), for example, to service messages based one or more factors. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, the method 800 can include obtaining a message including a signature and contextual information. For example, a computing system (e.g., vehicle computing system 112, etc.) can obtain a message including a cryptographic signature and contextual information. The contextual information can be indicative of one or more aspects of a surrounding environment of the autonomous vehicle. In some implementations, the message can include a route history indicative of one or more intermediary processes of the plurality of processes that have received the message.

At 820, the method 800 can include determining an originating sender for the message based on the signature. For example, a computing system (e.g., vehicle computing system 112, etc.) can determine an originating sender associated with the message based, at least in part, on the cryptographic signature. The originating sender can include a respective process of a plurality of processes running on one or more internal computing devices of the vehicle computing system and one or more remote computing devices. Each respective process of the plurality of processes can be associated with one or more process message privileges. The message privilege for the message can be determined based, at least in part, on the one or more process message privileges associated with the originating sender.

At 830, the method 800 can include determining a message privilege for the message based on the originating sender. For example, a computing system (e.g., vehicle computing system 112, etc.) can determine a message privilege for the message based, at least in part, on the originating sender. In some implementations, the message privilege for the message can be determined, based at least in part, on the one or more intermediary processes. In addition, or alternatively, the computing system can determine a message type for the message based, at least in part, on the contextual information of the message. The computing system can determine the message privilege for the message based, at least in part, on a comparison of the message type and the originating sender.

In some implementations, the computing system can determine an origination time associated with the message. The origination time ca n be indicative of a time in which the message was generated by the originating sender. The computing system can obtain a current time indicative of a time in which the message is obtained by the vehicle computing system. The computing system can determine the message privilege for the message based, at least in part, on a comparison of the origination time and the current time. For example, the message can be associated with a reliability time threshold indicative of a period of time after the origination time for which the contextual information is reliable. For instance, the computing system can determine a pending time period indicative of the period of time after the origination time. The computing system can determine the message privilege for the message based, at least in part, on a comparison of the pending time period and the reliability time threshold.

At 840, the method 800 can include determining a response for contextual information based on the message privilege. For example, a computing system (e.g., vehicle computing system 112, etc.) can determine a response for the contextual information based, at least in part, on the message privilege. The response is indicative of an acceptance or rejection of the contextual information.

For instance, the computing system can obtain a second message comprising a second cryptographic signature and second contextual information. The computing system can determine a second originating sender associated with the second message based, at least in part, on the second cryptographic signature. The computing system can determine a second message privilege for the second message based, at least in part, on the second originating sender. The computing system can determine by the vehicle computing system, the response for the contextual information based, at least in part, on a comparison between the message privilege and the second message privilege.

At 850, the method 800 can include generating a motion plan based on the response to the contextual information. For example, a computing system (e.g., vehicle computing system 112, etc.) can perform a vehicle action based at least in part on the response for the contextual information.

In addition, or alternatively, the method can include storing historical message data in one or more memories associated with the vehicle computing system. The historical data can include at least one of the route history of the message, the contextual information of the message, and/or the cryptographic signature of the message.

Figure 9:
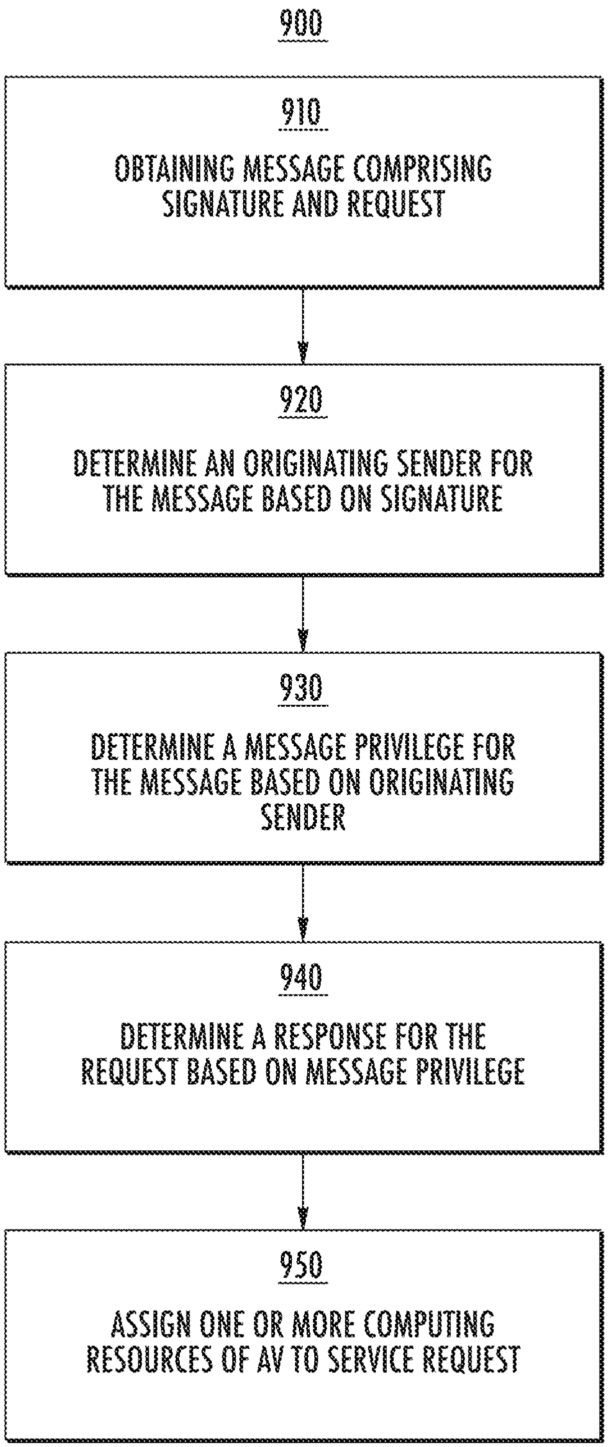
FIG. 9 depicts a flowchart diagram of an example method for servicing messages including a request according to example implementations of the present disclosure.

FIG. 9 depicts a flowchart diagram of an example method for servicing messages including a request according to example implementations of the present disclosure. One or more portion(s) of the method 900 can be implemented by a computing system that includes one or more computing devices such as, for example, the computing systems described with reference to the other figures (e.g., the vehicle computing system 112, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-4, 12, 13, etc.), for example, to service messages based one or more factors. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 910, the method 900 can include obtaining a message comprising a signature and a request. For example, a computing system (e.g., vehicle computing system 112, etc.) can include obtaining a message including a cryptographic signature and a request for access to one or more computing resources of the autonomous vehicle.

At 920, the method 900 can include determining an originating sender for the message based on the signature. For example, a computing system (e.g., vehicle computing system 112, etc.) can include determining an originating sender associated with the message based, at least in part, on the cryptographic signature. The originating sender can include a respective process of a plurality of processes running on one or more user computing devices communicatively connected to a vehicle computing system. Each of the one or more user computing devices can be associated with one or more user privileges. Each of the one or more user computing devices can be associated with a respective user of a plurality of users of a ride-share service provider.

At 930, the method 900 can include determining a message privilege for the message based on the originating sender. For example, a computing system (e.g., vehicle computing system 112, etc.) can include determining a message privilege for the message based, at least in part, on the originating sender. In some implementations, the message privilege for the message can be based, at least in part, on the one or more user privileges. For instance, the one or more user privileges can be based, at least in part, on a user account associated with the user of the user computing device or a transportation service purchased by the user.

At 940, the method 900 can include determining a response for the request based on the message privilege. For example, a computing system (e.g., vehicle computing system 112, etc.) can include determining a response to the request based, at least in part, on the message privilege. The response cam be indicative of an acceptance or rejection of the request.

At 950, the method 900 can include assigning one or more computing resources of an autonomous vehicle to service the request. For example, a computing system (e.g., vehicle computing system 112, etc.) can, in response to accepting the request, assign one or more computing resources of the autonomous vehicle to service the request. For instance, the computing system can assign at least one of the one or more computing resources of the autonomous vehicle to the message based on the message privilege.

For example, a computing system can facilitate one or more message queues. Each of the one or more message queues can include an ordered list of pending messages. The computing system can supplement at least one of the one or more message queues with the message based, at least in part, on the acceptance of the request and the message privilege. For instance, the computing resources can include one or more communication interfaces of the autonomous vehicle. Each of the one or more message queues is associated with at least one communication interface of the one or more communication interfaces.

Figure 10:
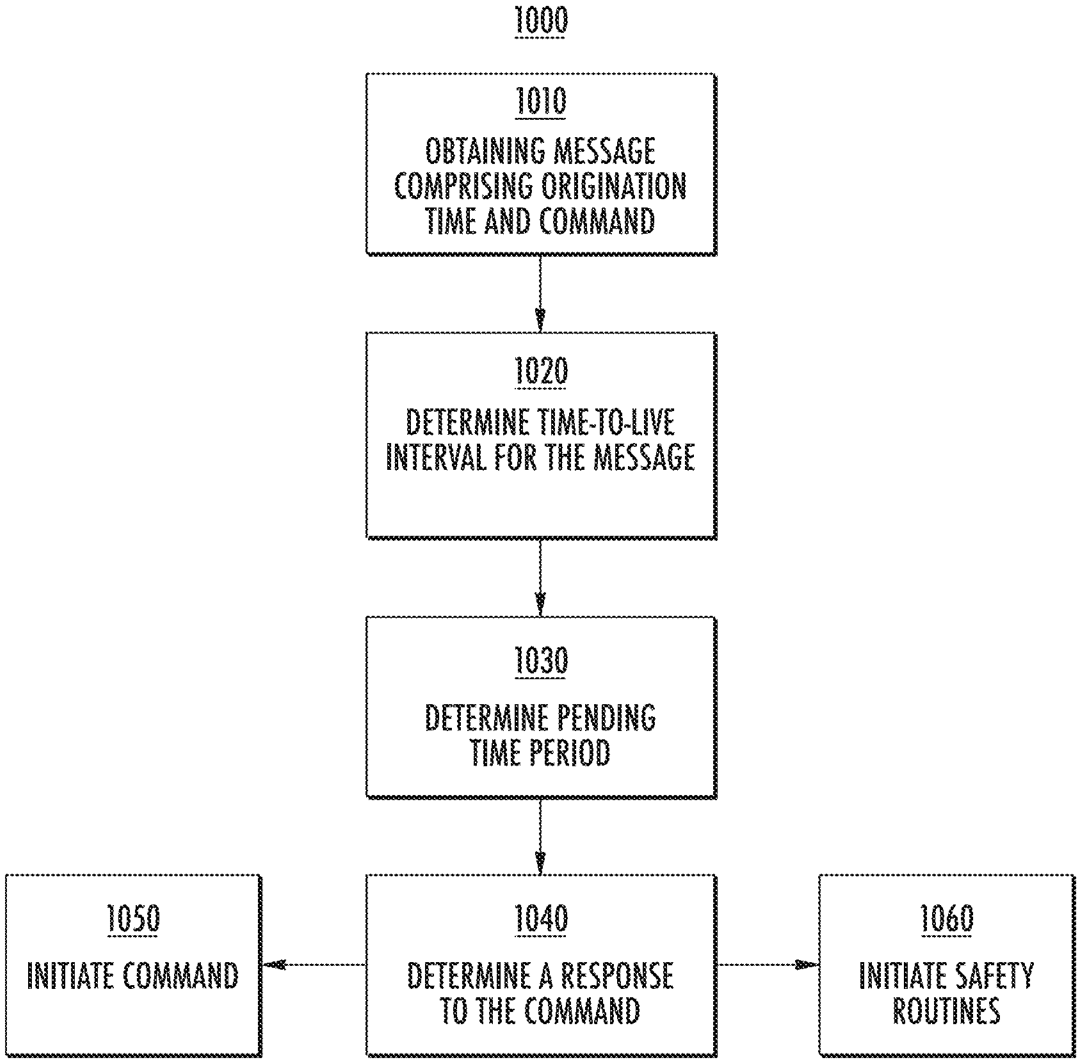
FIG. 10 depicts a flowchart diagram of an example method for servicing messages including a command according to example implementations of the present disclosure.

FIG. 10 depicts a flowchart diagram of an example method for servicing messages including a command according to example implementations of the present disclosure. One or more portion(s) of the method 1000 can be implemented by a computing system that includes one or more computing devices such as, for example, the computing systems described with reference to the other figures (e.g., the vehicle computing system 112, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-4, 12, 13, etc.), for example, to service messages based one or more factors. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1010, the method 1000 can include obtaining a message including an origination time and a command. For example, a computing system (e.g., vehicle computing system 112, etc.) can obtain a message including an origination time indicative of a time in which the message was generated and a command indicative of a task for the autonomous vehicle.

At 1020, the method 1000 can include determining a time-to-live interval for the message. For example, a computing system (e.g., vehicle computing system 112, etc.) can determine a time-to-live interval for the message indicative of a time period after the origination time during which the message is valid.

For instance, the computing system can obtain environmental data indicative of a surrounding environment of the autonomous vehicle. The environmental data can include at least one of map data indicative of the surrounding environment of the vehicle, current location data indicative of the location of the autonomous vehicle within the map data, signal quality data indicative of a signal quality associated with the message or the current location of the vehicle, and/or weather data indicative of the weather at the current time. In some implementations, the computing system can adjust the time-to-live interval for the message based, at least in part, on the environmental data.

At 1030, the method 1000 can include determine a pending time period. For example, a computing system (e.g., vehicle computing system 112, etc.) can determine a pending time period for the message based on a comparison between the origination time and a current time.

At 1040, the method 1000 can include determining a response to the command. For example, a computing system (e.g., vehicle computing system 112, etc.) can determine a response to the command based, at least in part, on the pending time period and the time-to-live interval. The response can include initiating the command or initiating one or more safety routines.

At 1050, the method 1000 can include initiating the command. For example, a computing system (e.g., vehicle computing system 112, etc.) can initiate the command. At 1060, the method 1000 can include initiating a safety routine. For example, a computing system (e.g., vehicle computing system 112, etc.) can initiate a safety routine.

Figure 11:
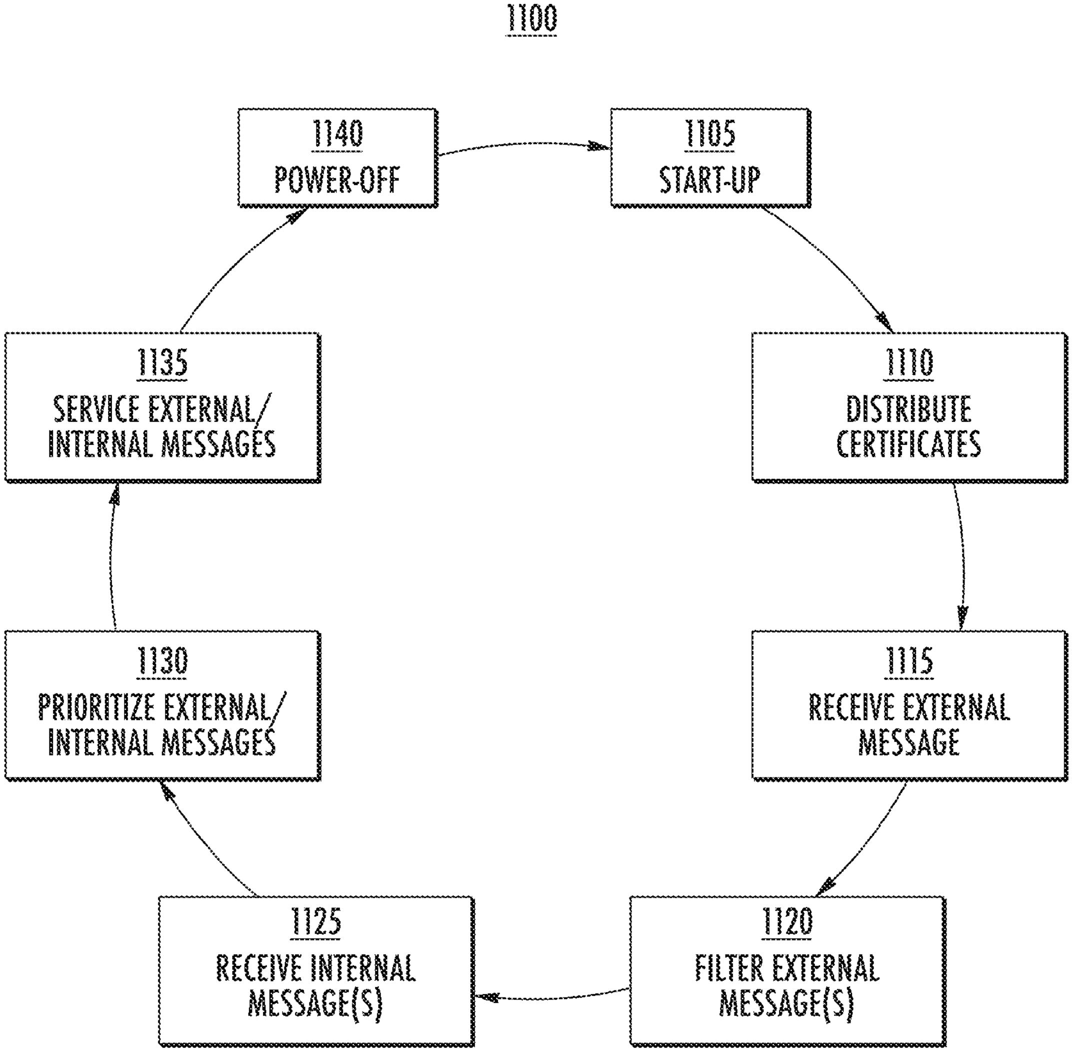
FIG. 11 depicts an example overview of message signing and processing according to example implementations of the present disclosure.

FIG. 11 depicts an example overview of message signing and processing according to example implementations of the present disclosure. For example, at start-up 1105, the computing system 1100 can begin distributing certificates 1110 (intermediate certificates, operational certificates, etc.) to one or more devices (remote devices, vehicle devices, etc.) and/or processes interacting with the computing system 1100. Each certificate can identify a respective device and/or process. In this manner, the computing system 1100 can identify messages transmitted between processes and/or devices with application level certainty. By way of example, each message can include an operational certificate that identifies the process (e.g., software container, application, etc.) that generated the message.

The computing system 1100 and/or a portion thereof (e.g., vehicle computing system 112 of FIG. 1) can receive external messages 1115 from one or more remote devices (e.g., device remote from the vehicle computing system 112). The computing system (e.g., vehicle computing system 112) can filter the external message(s) 1120 (e.g., at a communication interface 136 of the vehicle computing system 112) based on the remote process that generated the message (e.g., originating sender 550) and/or an internal process (e.g., running on the vehicle computing system 112) for which the message is intended (intended recipient process).

In addition, the computing system 1100 and/or a portion thereof (e.g., vehicle computing system 112 of FIG. 1) can receive internal messages 1125 from one or more internal processes (e.g., running on the vehicle computing system 112). The computing system 1100 can prioritize the external and/or internal messages 1130 based on the respective processes that generated the messages. The computing system 1100 can service the external and/or internal messages 1135 based on the assigned message priority by forwarding the messages, assigning computing resources to the message, initiating a vehicle action in response the message, etc. In this manner, the computing system 1100 can facilitate the transfer of messages between processes interacting with the computing system 1100 based on application level knowledge of the messaging processes until the computing system and/or portion thereof is powered-off 1140.

Figure 12:
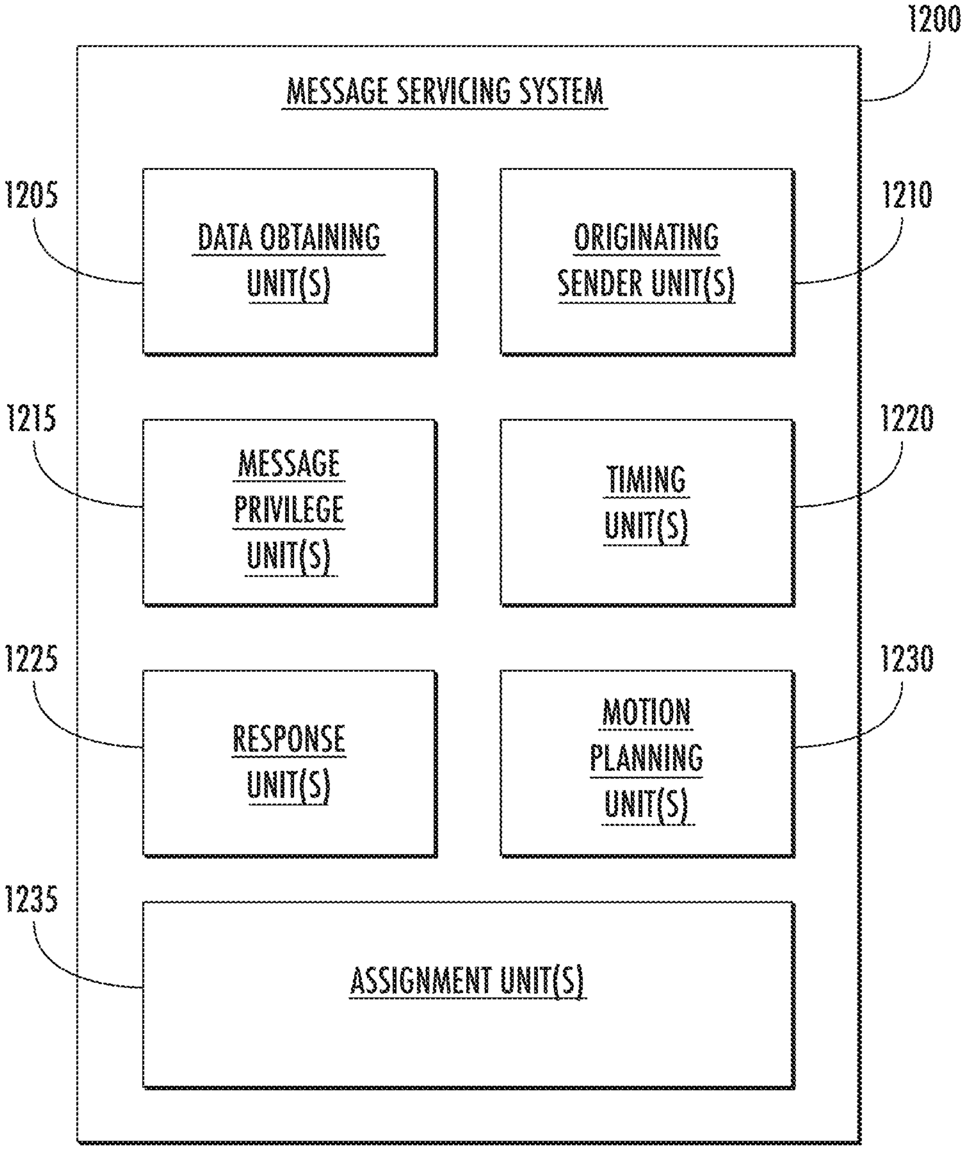
FIG. 12 depicts example system with various means for performing operations and functions according example implementations of the present disclosure.

FIG. 12 depicts example message servicing system 1200 with various means for performing operations and functions according example implementations of the present disclosure. One or more operations and/or functions in FIG. 12 can be implemented and/or performed by one or more devices (e.g., one or more computing devices of the vehicle computing system 112) or systems including, for example, the operations computing system 104, the vehicle 108, or the vehicle computing system 112, which are shown in FIG. 1. Further, the one or more devices and/or systems in FIG. 12 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a computing system 1200 can include data obtaining unit(s) 1205, originating sender unit(s) 1210, message privilege unit(s) 1215, timing unit(s) 1220, response unit(s) 1225, motion planning unit(s) 1230, assignment unit(s) 1235, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 1205, etc.) can be configured to obtain a message including a cryptographic signature and a request for access to one or more computing resources of the autonomous vehicle. In addition, or alternatively, the means (e.g., data obtaining unit(s) 1205, etc.) can be configured to obtain a message including a cryptographic signature and contextual information. In addition, the means (e.g., data obtaining unit(s) 1205, etc.) can be configured to obtain a message including an origination time indicative of a time in which the message was generated and a command indicative of a task for the autonomous vehicle.

The means (e.g., originating sender unit(s) 1210, etc.) can be configured to determine an originating sender associated with the message based, at least in part, on the cryptographic signature. The means (e.g., message privilege unit(s) 1215, etc.) can be configured to determine a message privilege for the message based, at least in part, on the originating sender.

The means (e.g., timing unit(s) 1220, etc.) can be configured to determining a time-to-live interval for the message indicative of a time period after the origination time during which the message is valid. The means (e.g., timing unit(s) 1220, etc.) can be configured to determine a pending time period for the message based on a comparison between the origination time and a current time.

The means (e.g., response unit(s) 1225, etc.) can be configured to determine a response for the contextual information based, at least in part, on the message privilege. The response can be indicative of an acceptance or rejection of the contextual information. The means (e.g., response unit(s) 1225, etc.) can be configured to determine a response for the request based, at least in part, on the message privilege. The response can be indicative of an acceptance or rejection of the request. The means (e.g., response unit(s) 1225, etc.) can be configured to determine a response to the command based, at least in part, on the pending time period, and the time-to-live interval. The response can include initiating the command or initiating one or more safety routines.

The means (e.g., motion planning unit(s) 1230, etc.) can be configured to generate a motion plan for the autonomous vehicle based, at least in part, on the response for the contextual information. The means (e.g., assignment unit(s) 1235, etc.) can be configured to, in response to accepting the request, assigning one or more computing resources of the autonomous vehicle to service the request.

Figure 13:
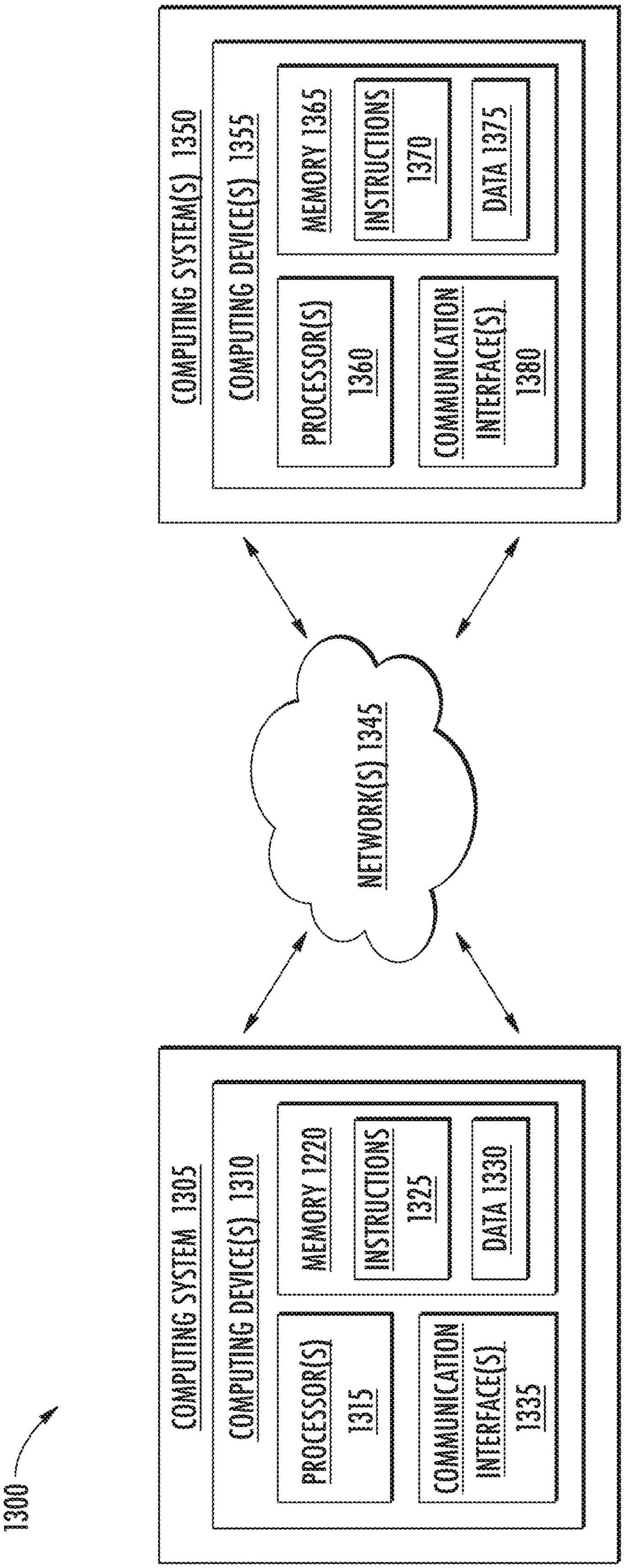
FIG. 13 depicts example system components according to example embodiments of the present disclosure.

FIG. 13 depicts example system components of an example system 1300 according to example embodiments of the present disclosure. The example system 1300 can include the computing system 1305 (e.g., a vehicle computing system 112) and the computing system(s) 1350 (e.g., operations computing system 104, remote computing device(s) 106, etc.), etc. that are communicatively coupled over one or more network(s) 1345.

The computing system 1305 can include one or more computing device(s) 1310 (e.g., vehicle devices running an intended recipient process, etc.). The computing device(s) 1310 of the computing system 1305 can include processor(s) 1315 and a memory 1320. The one or more processors 1315 can be any suitable processing device (e.g., a processor core, a microprocessor, an ASIC, a FPGA, a controller, a microcontroller, etc.) and can be one processor or a plurality of processors that are operatively connected. The memory 1320 can include one or more non-transitory computer-readable storage media, such as RAM, ROM, EEPROM, EPROM, one or more memory devices, flash memory devices, etc., and combinations thereof.

The memory 1320 can store information that can be accessed by the one or more processors 1315. For instance, the memory 1320 (e.g., one or more non-transitory computer-readable storage mediums, memory devices) can include computer-readable instructions 1325 that can be executed by the one or more processors 1315. The instructions 1325 can be software written in any suitable programming language or can be implemented in hardware. Additionally, or alternatively, the instructions 1325 can be executed in logically and/or virtually separate threads on processor(s) 1315.

For example, the memory 1320 can store instructions 1325 that when executed by the one or more processors 1315 cause the one or more processors 1315 to perform operations such as any of the operations and functions of the vehicle computing system 112, or for which the vehicle computing system 112 is configured, as described herein.

The memory 1320 can store data 1330 that can be obtained, received, accessed, written, manipulated, created, and/or stored. The data 1330 can include, for instance, message data such as content data, response data, signature data, environmental data, and/or other data/information described herein. In some implementations, the computing device(s) 1310 can obtain from and/or store data in one or more memory device(s) that are remote from the computing system 1305 such as one or more memory devices of the computing system 1350.

The computing device(s) 1310 can also include a communication interface 1335 used to communicate with one or more other system(s) (e.g., computing system 1350). The communication interface 1335 can include any circuits, components, software, etc. for communicating via one or more networks (e.g., 1345). In some implementations, the communication interface 1335 can include for example, one or more of a communications controller, receiver, transceiver, transmitter, port, conductors, software and/or hardware for communicating data/information.

The computing system 1350 can include one or more computing devices 1355 (e.g., remote device(s) running remote process, originating sender process 550, etc.). The one or more computing devices 1355 can include one or more processors 1360 and a memory 1365. The one or more processors 1360 can be any suitable processing device (e.g., a processor core, a microprocessor, an ASIC, a FPGA, a controller, a microcontroller, etc.) and can be one processor or a plurality of processors that are operatively connected. The memory 1365 can include one or more non-transitory computer-readable storage media, such as RAM, ROM, EEPROM, EPROM, one or more memory devices, flash memory devices, etc., and combinations thereof.

The memory 1365 can store information that can be accessed by the one or more processors 1360. For instance, the memory 1365 (e.g., one or more non-transitory computer-readable storage mediums, memory devices) can store data 1375 that can be obtained, received, accessed, written, manipulated, created, and/or stored. The data 1375 can include, for instance, message data, environmental data, and/or other data or information described herein. In some implementations, the computing system 1350 can obtain data from one or more memory device(s) that are remote from the computing system 1350.

The memory 1365 can also store computer-readable instructions 1370 that can be executed by the one or more processors 1360. The instructions 1370 can be software written in any suitable programming language or can be implemented in hardware. Additionally, or alternatively, the instructions 1370 can be executed in logically and/or virtually separate threads on processor(s) 1360. For example, the memory 1365 can store instructions 1370 that when executed by the one or more processors 1360 cause the one or more processors 1360 to perform any of the operations and/or functions described herein, including, for example, any of the operations and functions of the operations computing system 102, remote computing devices 106, and/or other operations and functions.

The computing device(s) 1355 can also include a communication interface 1380 used to communicate with one or more other system(s). The communication interface 1380 can include any circuits, components, software, etc. for communicating via one or more networks (e.g., 1345). In some implementations, the communication interface 1380 can include for example, one or more of a communications controller, receiver, transceiver, transmitter, port, conductors, software and/or hardware for communicating data/information.

The network(s) 1345 can be any type of network or combination of networks that allows for communication between devices. In some embodiments, the network(s) 1345 can include one or more of a local area network, wide area network, the Internet, secure network, cellular network, mesh network, peer-to-peer communication link and/or some combination thereof and can include any number of wired or wireless links. Communication over the network(s) 1345 can be accomplished, for instance, via a network interface using any type of protocol, protection scheme, encoding, format, packaging, etc.

FIG. 13 illustrates one example system 1300 that can be used to implement the present disclosure. Other computing systems can be used as well. Computing tasks discussed herein as being performed at vehicle computing device(s) can instead be performed remote from the vehicle (e.g., via the operations computing system, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle computing system onboard an autonomous vehicle comprising:

one or more communication interfaces;

one or more processors; and one or more tangible, non-transitory, computer readable media that collectively store instructions that when executed by the one or more processors cause the vehicle computing system to perform operations, the operations comprising:

(a) obtaining a message comprising a cryptographic signature and a request for access to one or more computing resources of the autonomous vehicle;

(b) determining an originating sender associated with the message based, at least in part, on the cryptographic signature;

(c) determining a message privilege for the message based, at least in part, on the originating sender;

(d) determining a response to the request based, at least in part, on the message privilege, wherein the response is indicative of an acceptance or rejection of the request;

(e) in response to accepting the request, assigning one or more computing resources of the autonomous vehicle to service the request, wherein assigning the one or more computing resources of the autonomous vehicle to service the request comprises determining that at least one of the one or more computing resources of the autonomous vehicle is available; and (f) controlling the autonomous vehicle using the assigned one or more computing resources.

2. The vehicle computing system of claim 1, wherein assigning one or more computing resources of the autonomous vehicle to service the request comprises:

assigning the at least one of the one or more computing resources of the autonomous vehicle to the message.

3. The vehicle computing system of claim 1, wherein the operations further comprise:

facilitating one or more message queues, each of the one or more message queues comprising an ordered list of pending messages; and supplementing at least one of the one or more message queues with the message.

4. The vehicle computing system of claim 3, wherein the computing resources comprise the one or more communication interfaces of the autonomous vehicle, and wherein each of the one or more message queues is associated with at least one communication interface of the one or more communication interfaces.

5. The vehicle computing system of claim 1, wherein the originating sender comprises a respective process of a plurality of processes running on one or more user computing devices communicatively connected to the vehicle computing system;

wherein each of the one or more user computing devices are associated with one or more user privileges; and wherein the message privilege for the message is based, at least in part, on the one or more user privileges.

6. The vehicle computing system of claim 5, wherein each of the one or more user computing devices are associated with a respective user of a plurality of users of a ride-share service provider.

7. The vehicle computing system of claim 6, wherein the one or more user privileges are based, at least in part, on a user account associated with the user of the user computing device or a transportation service purchased by the user.

8. A computer-implemented method for servicing messages including a request, the method comprising:

(a) obtaining a message comprising a cryptographic signature and a request for access to one or more computing resources of an autonomous vehicle;

(b) determining an originating sender associated with the message based, at least in part, on the cryptographic signature;

(c) determining a message privilege for the message based, at least in part, on the originating sender;

(d) determining a response to the request based, at least in part, on the message privilege, wherein the response is indicative of an acceptance or rejection of the request;

(e) in response to accepting the request, assigning one or more computing resources of the autonomous vehicle to service the request, wherein assigning the one or more computing resources of the autonomous vehicle to service the request comprises determining that at least one of the one or more computing resources of the autonomous vehicle is available; and (f) controlling the autonomous vehicle using the assigned one or more computing resources.

9. The computer-implemented method of claim 8, wherein assigning one or more computing resources of the autonomous vehicle to service the request comprises:

assigning the at least one of the one or more computing resources of the autonomous vehicle to the message.

10. The computer-implemented method of claim 8, further comprising:

facilitating one or more message queues, each of the one or more message queues comprising an ordered list of pending messages; and supplementing at least one of the one or more message queues with the message.

11. The computer-implemented method of claim 10, wherein the computing resources comprise one or more communication interfaces of the autonomous vehicle, and wherein each of the one or more message queues is associated with at least one communication interface of the one or more communication interfaces.

12. The computer-implemented method of claim 8, wherein the originating sender comprises a respective process of a plurality of processes running on one or more user computing devices communicatively connected to a vehicle computing system of the autonomous vehicle;

wherein each of the one or more user computing devices are associated with one or more user privileges; and wherein the message privilege for the message is based, at least in part, on the one or more user privileges.

13. The computer-implemented method of claim 12, wherein the message comprises a route history indicative of one or more intermediary processes of the plurality of processes that have received the message; and wherein the message privilege for the message is determined, based at least in part, on the one or more intermediary processes.

14. The computer-implemented method of claim 12, wherein each of the one or more user computing devices are associated with a respective user of a plurality of users of a ride-share service provider.

15. The computer-implemented method of claim 13, wherein the one or more user privileges are based, at least in part, on a user account associated with the user of the user computing device or a transportation service purchased by the user.

16. The computer-implemented method of claim 8, further comprising:

determining an origination time associated with the message, the origination time indicative of a time in which the message was generated by the originating sender;

obtaining a current time indicative of a time in which the message is obtained by the autonomous vehicle; and determining the message privilege for the message based, at least in part, on a comparison of the origination time and the current time.

17. The computer-implemented method of claim 16, wherein the message is associated with a reliability time threshold indicative of a period of time after the origination time for which the message is reliable; and wherein determining the message privilege for the message comprises:

determining a pending time period indicative of the period of time after the origination time; and determining the message privilege for the message based, at least in part, on a comparison of the pending time period and the reliability time threshold.

18. One or more non-transitory, computer-readable media storing instructions that, when implemented, cause one or more processors to perform operations, comprising:

(a) obtaining a message comprising a cryptographic signature and a request for access to one or more computing resources of an autonomous vehicle;

(b) determining an originating sender associated with the message based, at least in part, on the cryptographic signature;

(c) determining a message privilege for the message based, at least in part, on the originating sender;

(d) determining a response to the request based, at least in part, on the message privilege, wherein the response is indicative of an acceptance or rejection of the request;

(e) in response to accepting the request, assigning one or more computing resources of the autonomous vehicle to service the request, wherein assigning the one or more computing resources of the autonomous vehicle to service the request comprises determining that at least one of the one or more computing resources of the autonomous vehicle is available; and (f) controlling the autonomous vehicle using the assigned one or more computing resources.

19. The one or more non-transitory, computer-readable media of claim 18, wherein assigning one or more computing resources of the autonomous vehicle to service the request comprises:

assigning the at least one of the one or more computing resources of the autonomous vehicle to the message based on the message privilege.

20. The one or more non-transitory, computer-readable media of claim 18, wherein the originating sender comprises a respective process of a plurality of processes running on one or more user computing devices communicatively connected to a vehicle computing system of the autonomous vehicle.

* * * * *